US008437571B2

(12) United States Patent
Seroussi et al.

(10) Patent No.: US 8,437,571 B2
(45) Date of Patent: May 7, 2013

(54) METHOD AND SYSTEM FOR ADAPTIVE CONTEXT-EMBEDDED PREDICTION

(75) Inventors: Gadiel Seroussi, Cupertino, CA (US);
Erik Ordentlich, San Jose, CA (US);
Marcelo Weinberger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 865 days.

(21) Appl. No.: 12/387,404

(22) Filed: Apr. 30, 2009

(65) Prior Publication Data

US 2010/0278447 A1   Nov. 4, 2010

(51) Int. Cl.
*G06K 9/40* (2006.01)
*G06K 9/46* (2006.01)
*H04N 7/12* (2006.01)

(52) U.S. Cl.
USPC ........... 382/261; 382/239; 382/238; 382/224; 375/240.02; 375/240.12

(58) Field of Classification Search .................. 382/131, 382/224, 239, 255, 261, 275, 60, 238; 345/87; 375/240.02, 240.12
See application file for complete search history.

(56) References Cited

U.S. PATENT DOCUMENTS

| | | | | | |
|---|---|---|---|---|---|
| 5,877,813 | A | * | 3/1999 | Lee et al. ................. | 375/240.12 |
| 7,474,793 | B2 | * | 1/2009 | Weissman et al. ............ | 382/235 |
| 7,623,725 | B2 | * | 11/2009 | Ordentlich et al. ........... | 382/254 |
| 7,783,123 | B2 | * | 8/2010 | Ordentlich et al. ........... | 382/254 |
| 7,925,099 | B2 | * | 4/2011 | Ramirez et al. .............. | 382/232 |
| 8,098,890 | B2 | * | 1/2012 | Haseyama ................... | 382/103 |
| 2002/0124652 | A1 | * | 9/2002 | Schultz et al. ................. | 73/587 |
| 2002/0139581 | A1 | * | 10/2002 | Schultz et al. ................ | 175/39 |
| 2002/0144842 | A1 | * | 10/2002 | Schultz et al. ................ | 175/39 |
| 2002/0148644 | A1 | * | 10/2002 | Schultz et al. ................ | 175/39 |
| 2002/0148646 | A1 | * | 10/2002 | Schultz et al. ................ | 175/40 |
| 2002/0148648 | A1 | * | 10/2002 | Schultz et al. ................ | 175/56 |
| 2003/0026492 | A1 | * | 2/2003 | Gallagher .................... | 382/254 |
| 2003/0076988 | A1 | * | 4/2003 | Liang et al. .................. | 382/131 |
| 2003/0081854 | A1 | * | 5/2003 | Deshpande .................. | 382/261 |
| 2003/0112370 | A1 | * | 6/2003 | Long et al. ................... | 348/474 |
| 2004/0066978 | A1 | * | 4/2004 | Nanbu ......................... | 382/261 |
| 2005/0289406 | A1 | * | 12/2005 | Weissman et al. ............ | 714/704 |
| 2006/0045360 | A1 | * | 3/2006 | Weissman et al. ............ | 382/232 |
| 2006/0047438 | A1 | * | 3/2006 | Ordentlich et al. ............ | 702/19 |

(Continued)

OTHER PUBLICATIONS

Mboup et al. "LMS Coupled Adaptive Prediction and System Identification" IEEE Transactions on Signal Processing vol. 42, No. 10, Oct. 1994 pp. 1-9.*

(Continued)

*Primary Examiner* — Chan S Park
*Assistant Examiner* — Mia M Thomas

(57) ABSTRACT

One embodiment of the present invention is directed to an adaptive context-based predictor that predicts a value x̂ from a context, stored in an electronic memory, corresponding to a noisy-dataset symbol $z_i$ of a noisy dataset corrupted with noise modeled as being introduced by a noise-introducing channel. The adaptive context-based predictor is adapted according to one or more parameters that specify adaptive context-based-predictor operation, at least one of which functionally depends, or partially functionally depends, on a level of noise represented by the noise-introducing channel. The adaptive context-based predictor computes a number of intermediate values from the context, computes the predicted value x̂ from the intermediate values, and stores the predicted value x̂ in the electronic memory.

12 Claims, 35 Drawing Sheets

U.S. PATENT DOCUMENTS

| | | | |
|---|---|---|---|
| 2006/0047484 A1* | 3/2006 | Seroussi et al. | 702/191 |
| 2006/0177097 A1* | 8/2006 | Fujimura et al. | 382/103 |
| 2006/0257043 A1* | 11/2006 | Chiu | 382/261 |
| 2007/0116373 A1* | 5/2007 | Hwang et al. | 382/261 |
| 2007/0133898 A1* | 6/2007 | Gemelos et al. | 382/275 |
| 2008/0247659 A1* | 10/2008 | Ramirez et al. | 382/252 |
| 2008/0317287 A1* | 12/2008 | Haseyama | 382/103 |
| 2009/0257486 A1* | 10/2009 | Chiu et al. | 375/240.02 |
| 2010/0278447 A1* | 11/2010 | Seroussi et al. | 382/260 |
| 2011/0026848 A1* | 2/2011 | Ordentlich et al. | 382/260 |
| 2011/0026850 A1* | 2/2011 | Weinberger et al. | 382/261 |
| 2011/0090352 A1* | 4/2011 | Wang et al. | 348/208.6 |
| 2011/0090378 A1* | 4/2011 | Wang et al. | 348/242 |

OTHER PUBLICATIONS

Weismann et al. "Universal Discrete Denoising: Known Channel" IEEE Transactions on Information Theory vol. 51, No. 1 Jan. 2005 (pp. 1-24).*

Motta et al. "The Dude Framework for Continuous Tone Image Denoising" 2005 IEEE pp. 1-4.*

Gogu et al. "On Image Denoising with Wavelets-A Case Study by Considering a Priori Distortion" 2010 IEEE pp. 1-4.*

* cited by examiner

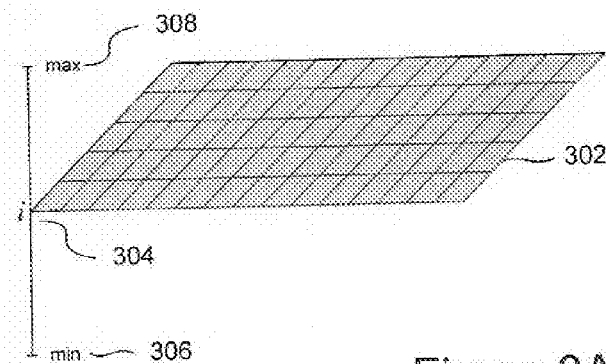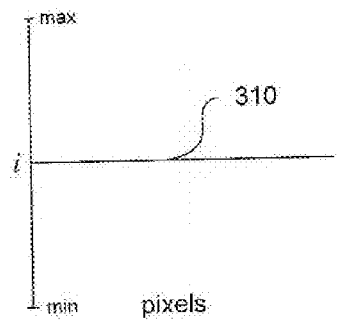
Figure 3A
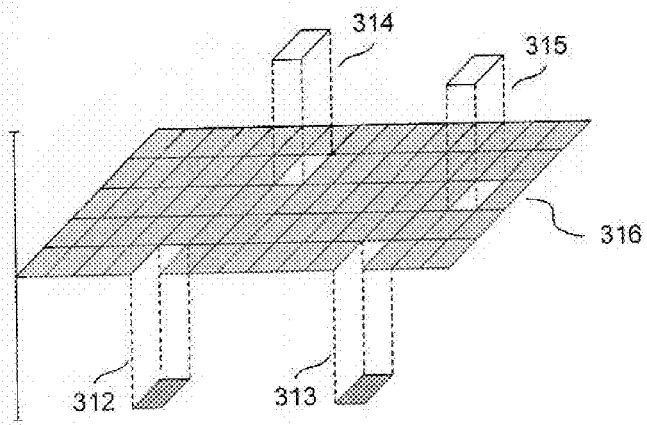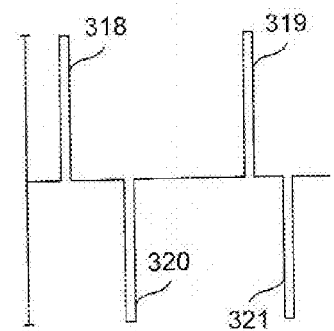
Figure 3B
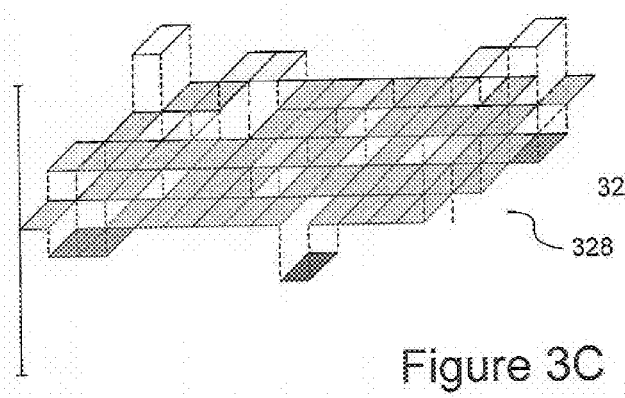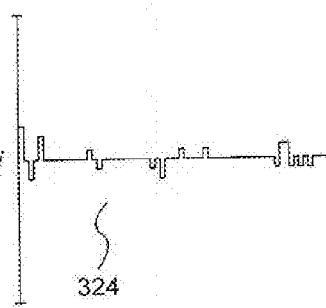
Figure 3C

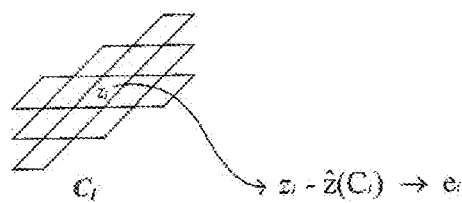
Figure 7
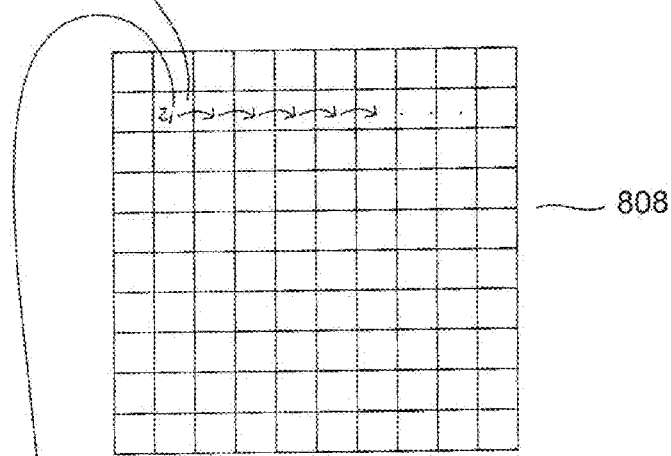
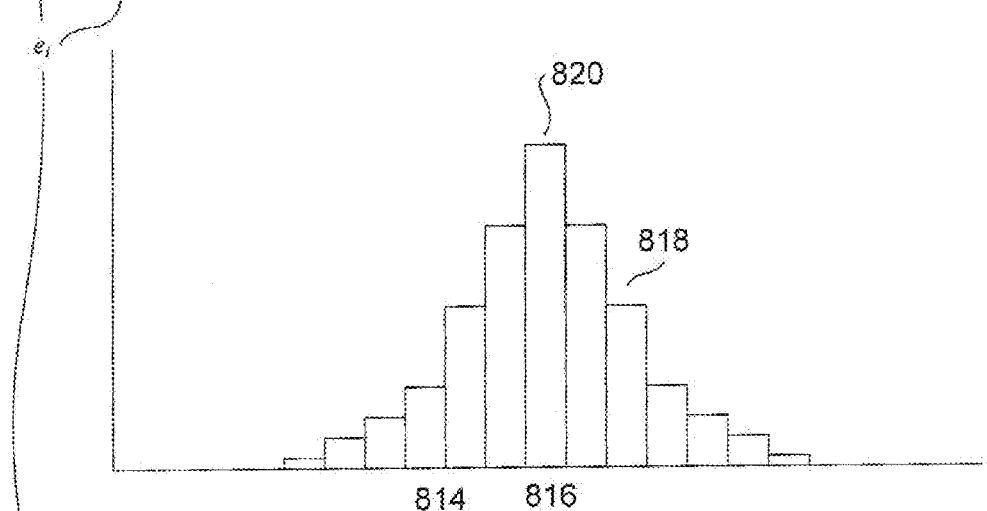
Figure 8

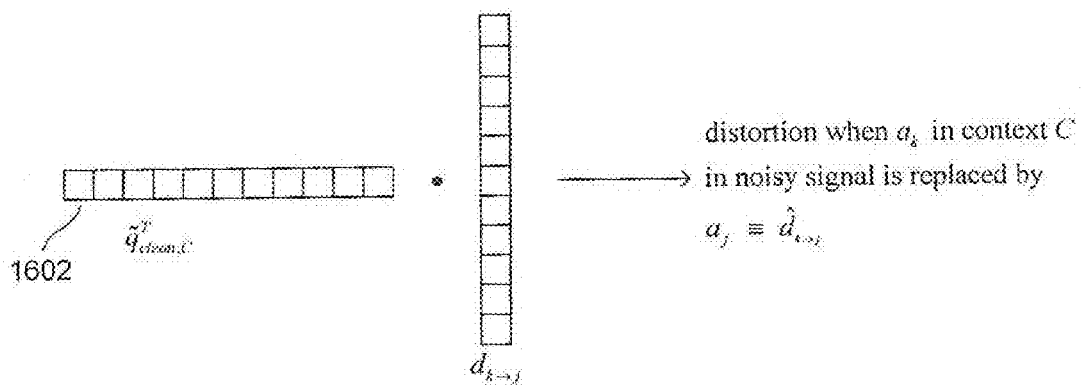
Figure 16
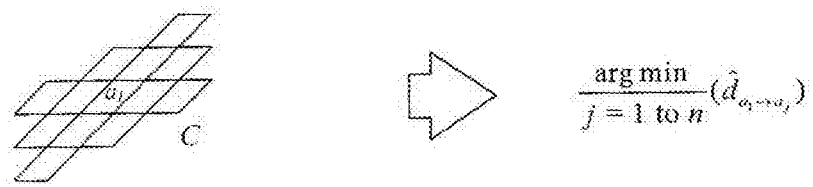
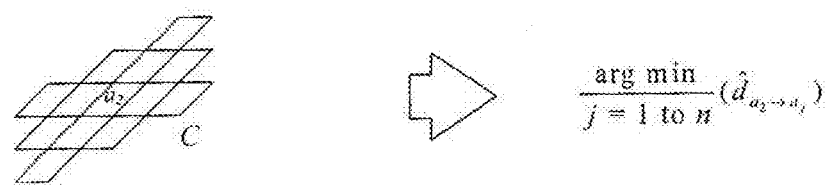
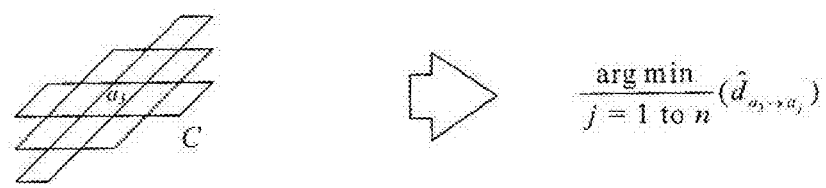
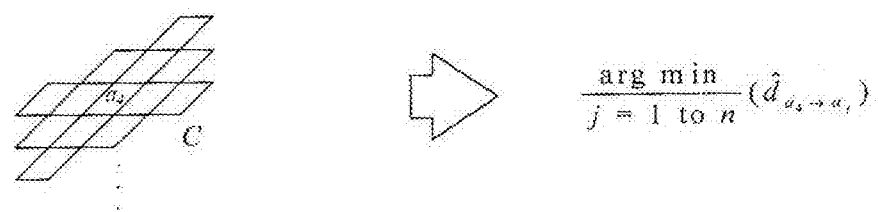
Figure 17

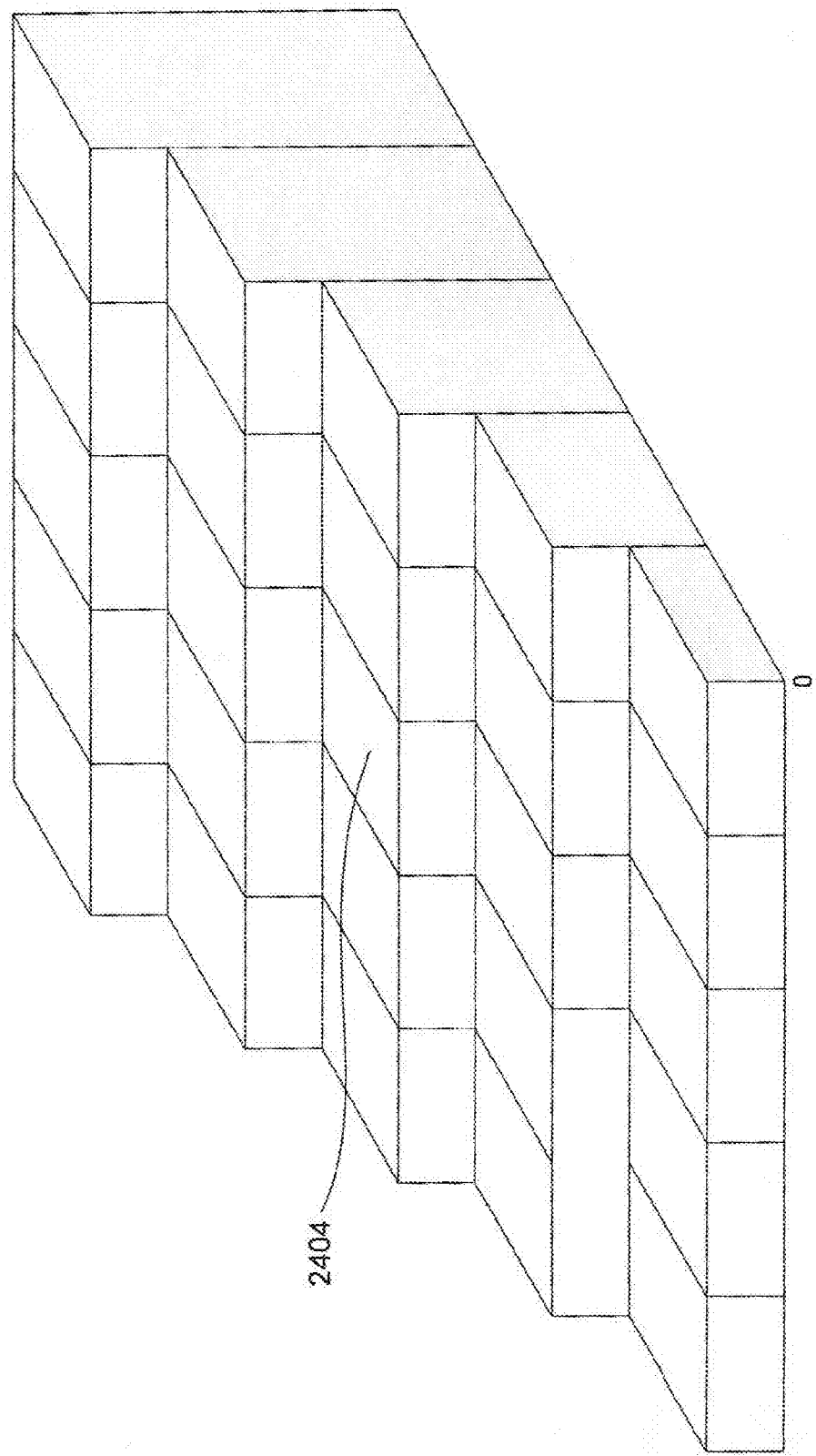

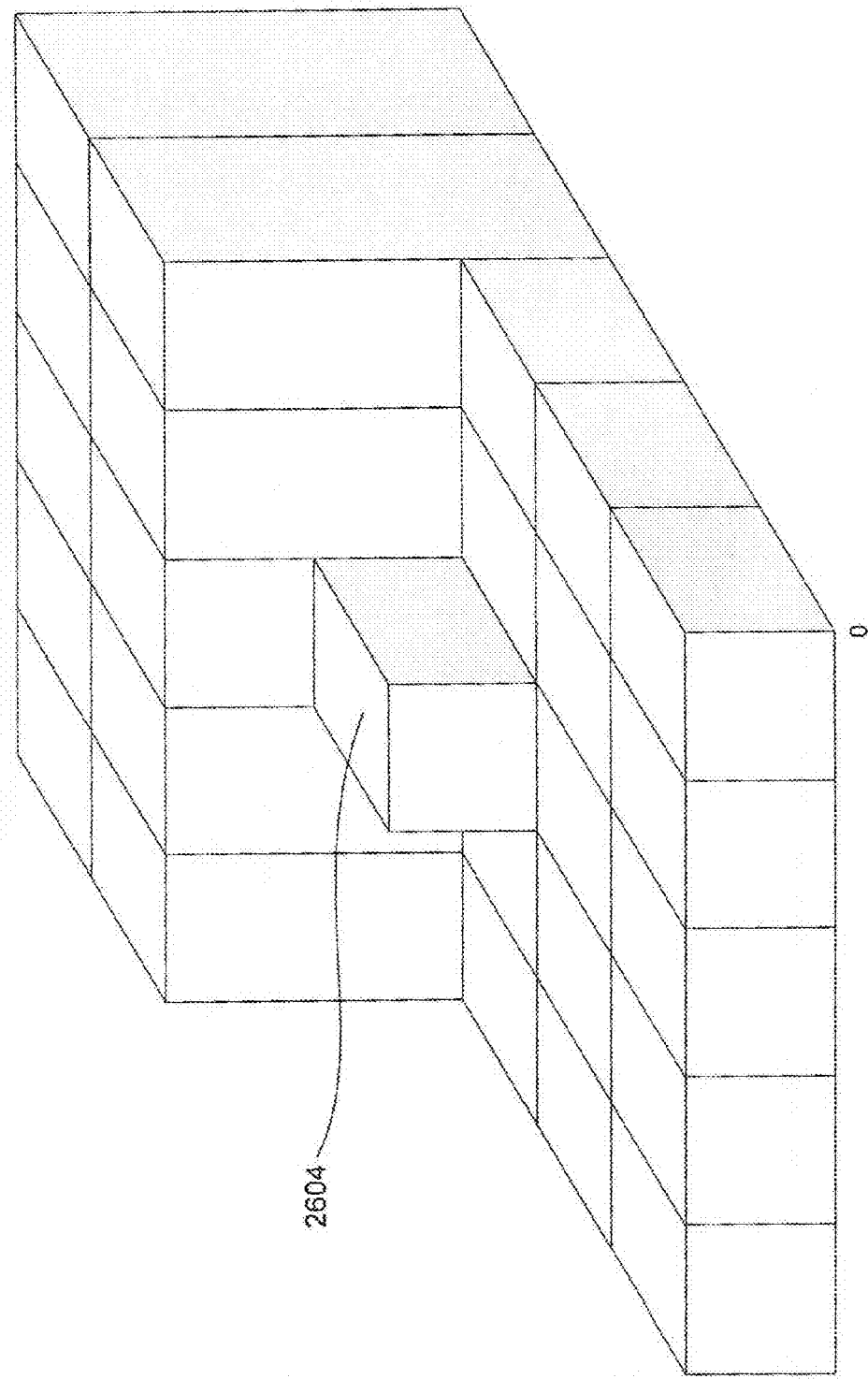

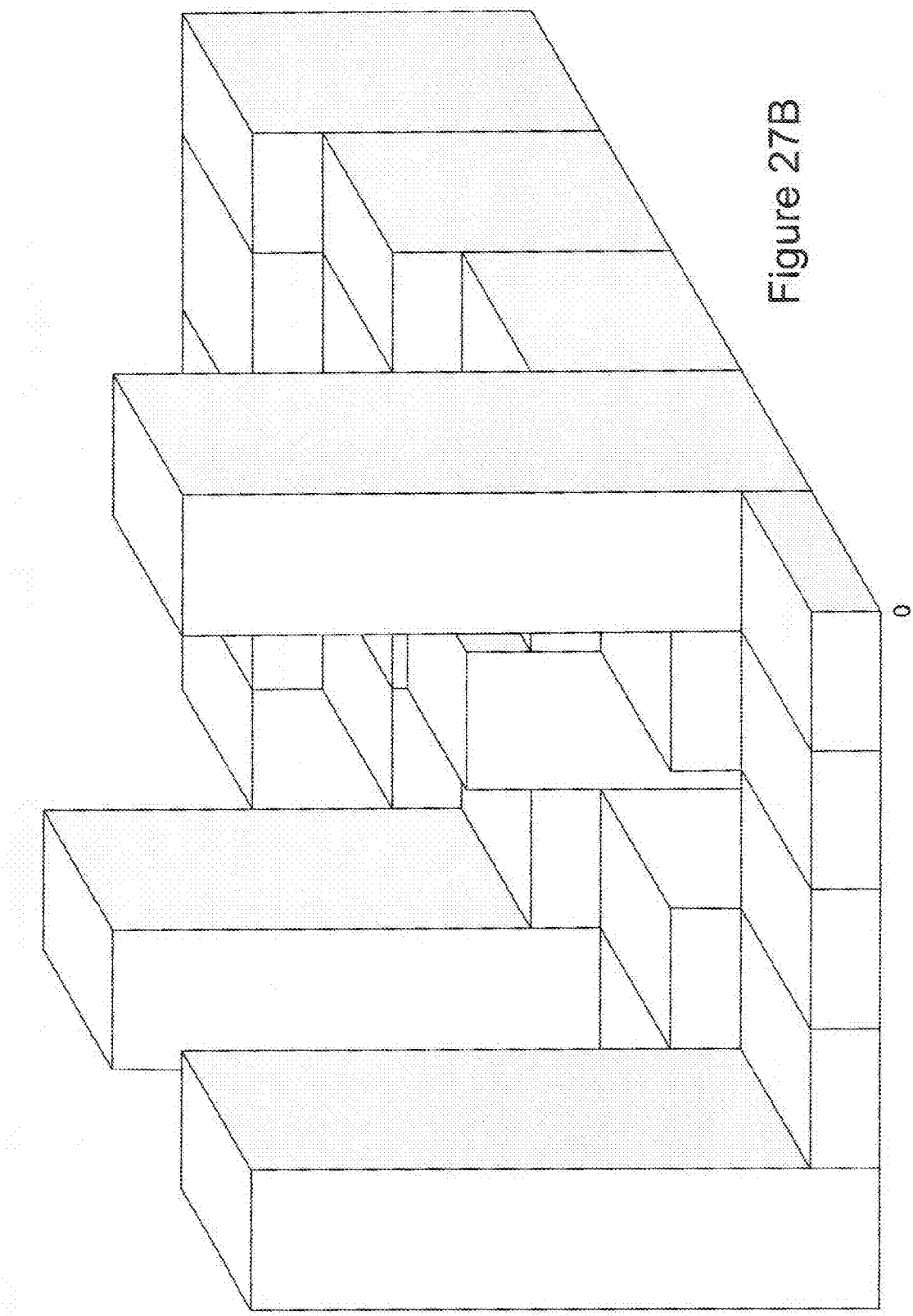

METHOD AND SYSTEM FOR ADAPTIVE CONTEXT-EMBEDDED PREDICTION

TECHNICAL FIELD

The present invention is related to prediction of a value corresponding to a context-embedded symbol, the prediction used to filter, prefilter, and/or denoise noisy data, and is related, in particular, to an adaptive context-embedded symbol prediction method and system that can be parametrically adapted to characteristics of the noisy data, including characteristics of the noise within the data.

BACKGROUND OF THE INVENTION

Whenever information is electronically encoded as original, or clean, data, and then transferred from the data source to a data destination, noise may be introduced into the data by the transfer process, resulting in alteration of the original, clean data and reception of the data by the data destination as noisy data. For example, when information is electronically encoded as a sequence of binary bits and sent through a communications network, such as a local Ethernet, to a destination node, there is a small probability that any given bit within the original, or clean, sequence of binary bits ends up being corrupted during transfer through the Ethernet, resulting in a "0" bit in the clean data being altered to a "1" bit in the noisy data received at the destination node, or a "1" bit in the clean data altered to a "0" bit in the noisy data received at the destination node. Although electronic communications media are classic examples of noisy channels, almost any type of data transfer, data storage, or data manipulation may result in data corruption, and therefore may be modeled as a noisy channel. For example, there is a small probability, associated with each bit of a block of binary data, that the bit will be altered when the block of data is stored and then retrieved from a hard disk, or even when the block of data is transferred from local cache memory to global random-access memory within a computer system. In general, redundant data, including check sums and cyclical redundancy codes, are embedded into data encodings to allow corrupted data to be detected and repaired. However, the amount of redundant data needed, and the accompanying costs and inefficiencies associated with redundant data, grows as the acceptable level of undetectable and/or unrepairable data corruption decreases.

In many cases, data corruption may occur prior to a point in a process at which redundant information can be embedded into a data signal to facilitate error detection and correction. As one example, a scanner that optically scans a printed document to produce a digital, electronic encoding of an image of the document can be viewed as a noisy channel in which discrepancies between the digitally encoded image of the document and the original document may arise. Such discrepancies may be introduced by a variety of optical and electronic components within the scanner that focus an optical image of the document onto a light-detecting component that transforms the detected optical image into an electronically encoded image of the document. When the digitally encoded image of the document is displayed or printed, different types of noise may be perceived as graininess, irregularities along the edges of text characters or objects within graphical images, uneven shading or coloration, random speckling, or other such visually distinguishable differences between the printed or displayed version of the digitally encoded data and the original document.

Denoising techniques can be applied to a noisy, digitally encoded image in order to produce a denoised, digitally encoded image that more accurately represents the original document that was scanned to produce the noisy, digitally encoded image. Denoising techniques may also be applied to data received over channels that are too noisy for recovery of the original data using the redundant data incorporated within the data to facilitate error correction. A wide variety of additional applications of denoising techniques have been identified and are well known. Recently, a discrete universal denoiser method ("DUDE") has been developed for denoising the noisy output signal of a discrete, memoryless data-transmission channel without relying on knowledge of, or assumptions concerning, the statistical properties of the original, or clean, signal input to the discrete, memory-less channel. Even more recently, the DUDE method has been extended for denoising continuous tone images, such as scanned documents or images. The extended DUDE method is referred to as the "DUDE-CTI method," or simply as the "DUDE-CTI." The DUDE-CTI method is intended for use in a variety of image and data scanning, processing, and transfer applications. The DUDE-CTI method has shown promising results for certain types of noisy channels. An efficient DUDE-CTI depends on collections of symbol-occurrence statistics for each of a large number of different pixel contexts observed within an image. Because of the large number of possible contexts, an expedient approach is to coalesce individual contexts into groups, or classes, of contexts, and to then collect statistics on a context-class basis, rather than for individual contexts. The coalescing of individual contexts involves correcting prediction-class statistics for a prediction-class bias with respect to the context class that includes the prediction classes.

In various embodiments of the DUDE-CTI method, and other denoising methods, a predictor that predicts a symbol or other value based on a context is used for statistics-collection phases of the denoising method, particularly for collecting statistics related to prediction-class biases. Predictors may work well when an image is relatively pristine, with only a relatively small amount of noise, but may work poorly in the presence of greater noise levels, or in the presence of certain types of noise, even at modest levels. Information-theory researchers, designers, manufacturers, and vendors of data-producing and data-consuming electronic devices affected by noise, and, ultimately, users of a variety of data-producing and/or data-consuming electronic devices and systems all continue to seek improved methods for context-based prediction that are effective despite noise corruption of the underlying image or dataset.

BRIEF DESCRIPTION OF THE DRAWINGS

FIGS. 3A-C illustrate salt-and-pepper noise and Gaussian noise.

FIG. 7 illustrates computation of an error $e_i$ for a symbol $z_i$ observed within a context $C_i$ in noisy signal.

FIG. 8 illustrates accumulation of error information for a particular context during analysis of a noisy image signal.

FIG. 16 illustrates the computation of an estimate of the distortion produced by replacing symbol $a_k$ within context C in a noisy signal by the replacement symbol $a_j$.

FIG. 17 illustrates a symbol-replacement function g(C,z).

FIGS. 24A-B, 25A-B, 26A-B, and 27A-B illustrate four exemplary contexts and prediction for centrally-embedded symbol by the predictor $F_a$ for the four exemplary contexts.

DETAILED DESCRIPTION OF THE INVENTION

Embodiments of the present invention provide adaptive context-based predictors for filtering, prefiltering, and/or denoising noise-corrupted datasets. Various parameters that describe global characteristics of the dataset, local characteristics within the dataset, and/or noise-introducing-channel characteristics, are used to adjust the adaptive context-based predictors to provide a specified level of effectiveness over a wide range of global-data, local-data, and noise-introducing-channel conditions and characteristics.

In a first subsection, denoising and the DUDE and DUDE-CTI denoising methods are first described, with reference to FIGS. 1-20, in order to provide a basis and one example of a practical application of the adaptive context-based predictors that represent embodiments of the present invention. Embodiments of the present invention are discussed in a following subsection.

Denoising and the DUDE and DUDE-CTI Denoising Methods

Figure 1:
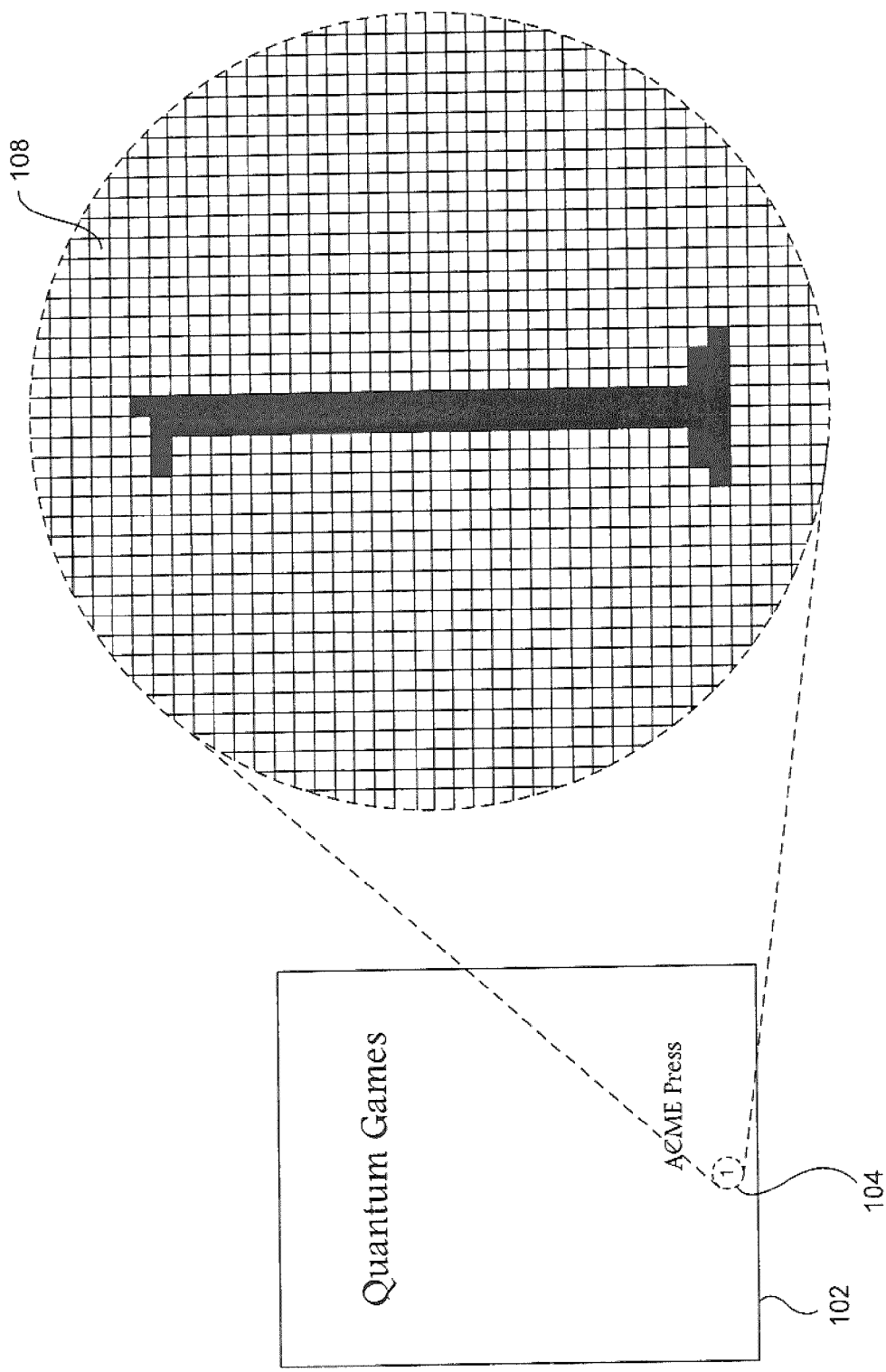
FIG. 1 illustrates digital encoding of a printed document to produce a clean image signal.

FIG. 1 illustrates digital encoding of a printed document to produce a clean image signal. In FIG. 1, a displayed image 102 of a digitally encoded title page is shown, with a small disk-like region 104 of the displayed document shown at a higher magnification 106. The document is displayed as an array of square pixels, such as pixel 108, and the digital encoding of the document comprises a sequence of integers, each integer representing an intensity value of a corresponding pixel. Commonly, for multi-level document images, pixel values range over a grayscale range from 0, indicating black, to 255, indicating white, with a continuous range of intermediate gray tones encoded by the integers 1-254. The integers 0-255 can therefore be considered to be symbols of a 256-symbol alphabet. Different techniques may be used to encode colored images. In one technique, three different grayscale-like encodings are used to encode intensity values of three primary colors, and the three different encodings are simultaneously displayed or rendered by a three-primary-color display or rendering device. Alternatively, a larger range of integer values may be used to encode a full range of color and intensity values in a single integer field. Thus, a pixel corresponds to a small region of a displayed or printed image, and the integer value associated with a pixel in a digitally encoded image represents the intensity, or both the color and intensity, for display or rendering of the pixel on a display or rendering device.

Figure 2:
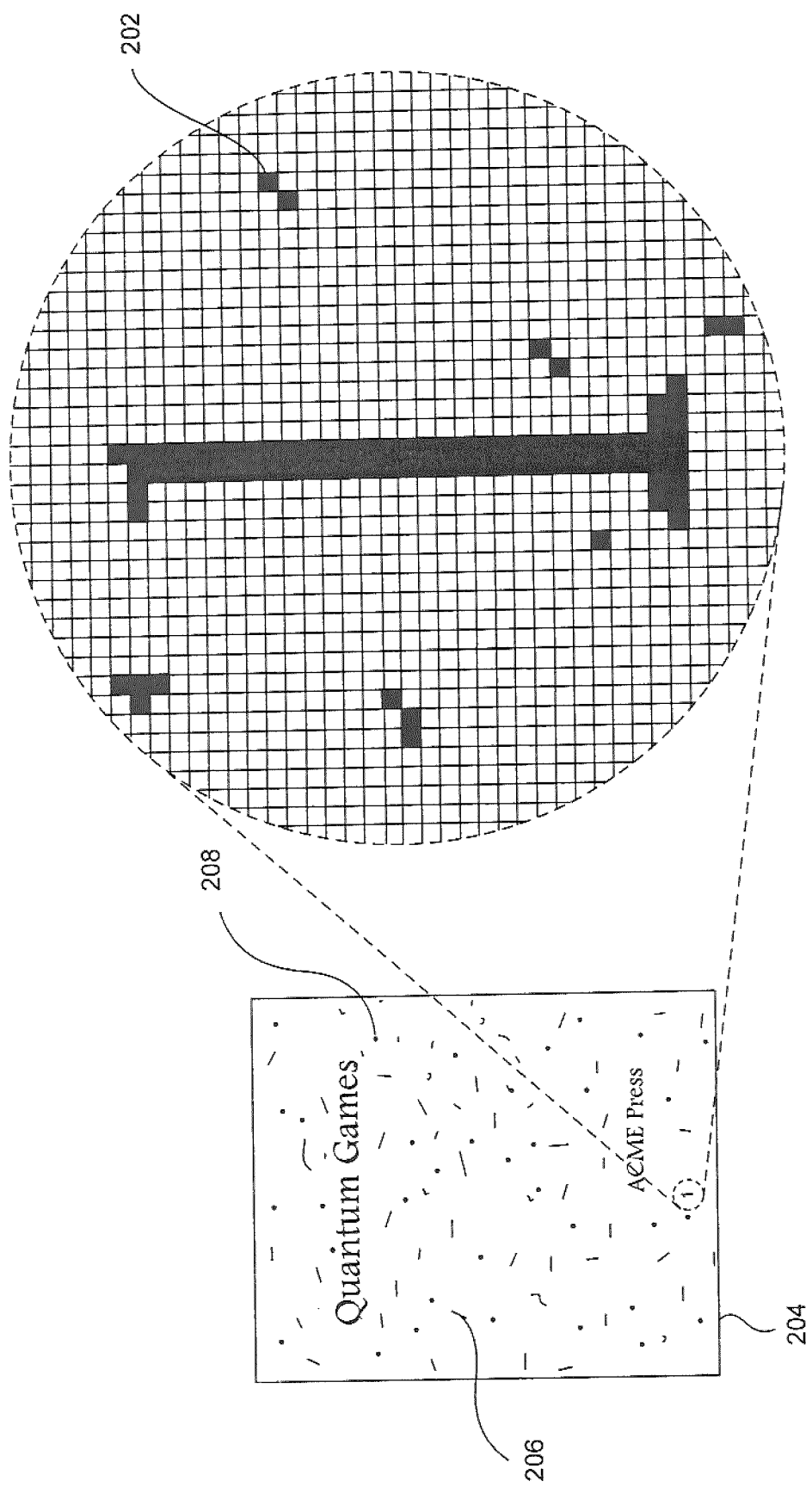
FIG. 2 illustrates a noisy signal corresponding to the clean image signal discussed with reference to in FIG. 1.

A printed document that is to be scanned by a scanning device can be considered as a clean signal. In other words, the printed document can be viewed as a large set of pixel-intensity values that, when displayed or printed, would appear visually indistinguishable from the original, printed document. The pixel data actually obtained as a result of scanning may be considered to be a noisy signal. FIG. 2 illustrates a noisy signal corresponding to the clean image signal discussed with reference to in FIG. 1. In comparing FIG. 2 to FIG. 1, it is easily observed that a number of pixels, such as pixel 202, have intensity values different from the values that the pixels would be expected to have based on the original, clean image shown in FIG. 1. The corresponding noisy image 204 is seen to have a number of visually discernable distortions, such as streaks 206 and speckles 208. In a scanning application, the original document represents the clean image signal, and the digitally encoded document produced by scanning the original document represents the noisy image signal. In various other applications, the clean signal may be an initial, digitally encoded document or other information source, and the noisy signal may be the corresponding digitally encoded document or other information source received following transmission of the clean signal through a communications medium or retrieved following storage of the clean signal in a volatile or non-volatile electronic data-storage device.

FIGS. 3A-C illustrate salt-and-pepper noise and Gaussian noise. FIG. 3A shows a small portion of a digitally encoded image 302, all pixels of which have a uniform intensity value i 304 with respect to a range of pixel-intensity values from a minimum value (306 in FIG. 3) to a maximum value (308 in FIG. 3). A two-dimensional graph of the intensity values of individual pixels from the region, in which pixels are taken in some particular order from the two-dimensional image, produces a straight, horizontal line 310. FIG. 3B illustrates salt-and-pepper noise added to the small region of uniform pixel intensity shown in FIG. 3A. Salt-and-pepper noise can be modeled as independent probabilities, associated with each pixel, that the intensity value associated with the pixel is altered, or corrupted, by a noisy channel to have either a minimum intensity value or a maximum intensity value. In FIG. 3B, two pixels 312-313 have intensity values altered to the minimum intensity value and two pixels 314-315 have intensity values altered to the maximum intensity value. A two-dimensional graph of the pixel intensity values for the pixels of the small region 316 of an image with added salt-and-pepper noise is seen to exhibit a number of narrow spikes 318-321 corresponding to pixels with altered, or corrupted, intensity values. FIG. 3C illustrates Gaussian noise added to the small region of uniform pixel intensity shown in FIG. 3A. Gaussian noise may be modeled as the addition of a value of an independent Gaussian random variable, associated with each pixel, to the pixel intensity value of the pixel. In one convenient mathematical model, the Gaussian random variables are considered to be independent, and to be identically distributed. Actual Gaussian-like noise produced by various types of noisy channels may not exhibit independent and identical distributions of alterations in pixel intensities, but a model employing independent and identically distributed Gaussian random variables often serves as a reasonable approximation for different types of Gaussian-like noise, and provides a tractable and computable mathematical framework for analysis of the noise. A two-dimensional graph of the pixel intensity values of the small region of an image shown in FIG. 3A with added Gaussian noise shows random fluctuations 324 about an expected pixel intensity i 326 for the small region of the image 328.

A discrete universal denoiser for continuous-tone images ("DUDE-CTI") has been developed for general denoising of digitally encoded images, and other noisy data. The DUDE-CTI method is next described, as one practical application for context-based predictors that represent embodiments of the present invention.

Figure 4A:
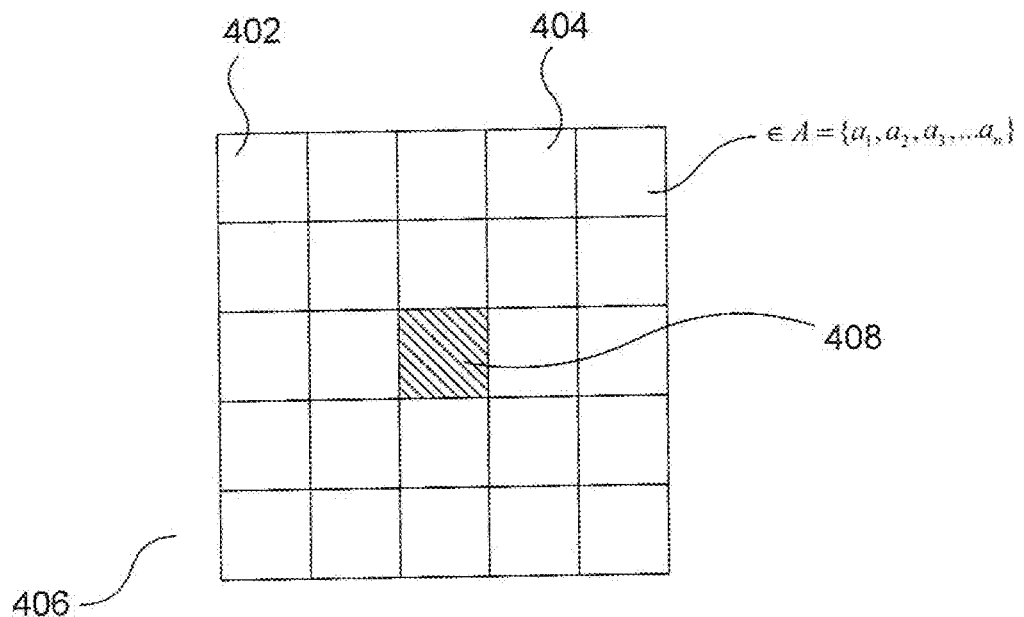
FIGS. 4A-B illustrate two different, well defined context neighborhoods that may be employed during analysis and denoising of image signals.
Figure 4B:
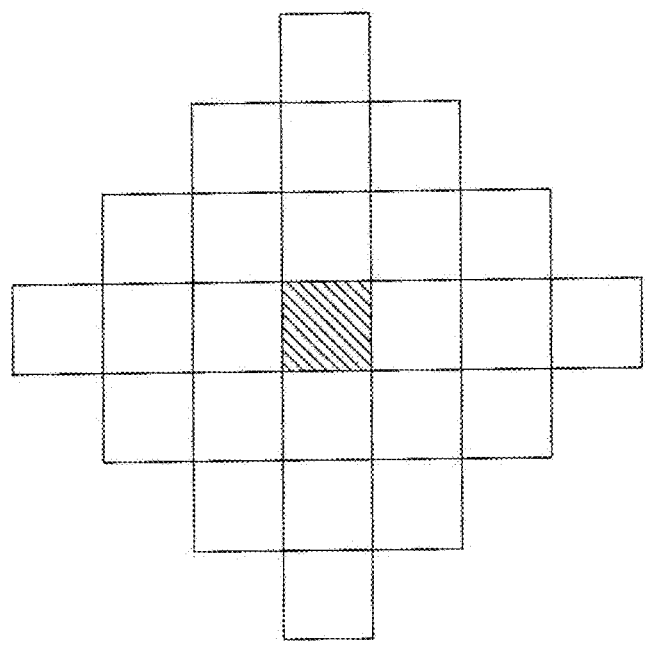

In both the DUDE-CTI and other context-based denoisers, an image signal, or digitally encoded image, is considered to be a two-dimensionally-ordered sequence of symbols, each symbol mapped to one of a finite set of numerical values. Most of the symbols in a signal have well-defined two-dimensional contexts, or neighborhoods, and these contexts play a significant role in both the DUDE-CTI and other denoisers. FIGS. 4A-B illustrate two different, well defined contexts that may be employed during analysis and denoising of image signals. Each square, such as square 402 in FIG. 4A, represents a single pixel intensity value within an image signal. As shown in FIG. 4A, the pixel intensity value associated with a pixel, such as the pixel intensity value associated with pixel 404, is considered during analysis and denoising as a symbol $z_i$ chosen from a finite alphabet $A \equiv \{a_1, a_2, a_3, \ldots a_n\}$ where the index i indicates the order, or position, of the pixel within the signal. The pixel intensity value, or symbol $z_i$, associated with pixel i may be any one of the symbols in alphabet A. For common encodings of multi-level images, the symbols in A, $\{a_1, a_2, a_3, \ldots a_n\}$, are the unsigned, single byte values 0, 1, . . . , 255. In each of several passes, the DUDE-CTI and other denoisers consider each symbol within a signal with respect to the symbol's context. The context 406 shown in FIG. 4A for a currently considered pixel, or central symbol, 408 comprises the pixel values contained in a 5×5 square region surrounding the currently considered pixel 408, but not including the currently considered pixel. In other words, the context for symbol 408 comprises the values of the 24 nearest symbol neighbors within the image signal containing currently considered symbol 408. In the discussion of the DUDE-CTI denoiser, the currently considered symbol, such as symbol 408 in FIG. 4A, is referred to as the "central symbol" of the context surrounding the symbol, but the context is not considered to include the central symbol.

Many different context shapes and sizes are possible. FIG. 4B shows an alternative 24-symbol context for an image signal. In general, the useful information content per symbol of a context may increase with increasing size up to a context size of maximum useful information per symbol, and then decrease with context sizes greater than the context size of maximum useful information per symbol. Analysis and denoising of noisy signals involves frequent context-based computations, with execution times increasing with increases in the context size employed in the analysis. Therefore, efficiency constraints may constrain context sizes to sizes, in symbols, below the maximum useful information per symbol size. Moreover, the maximum useful information per symbol context size may vary with the image signals being denoised.

Figure 5A:
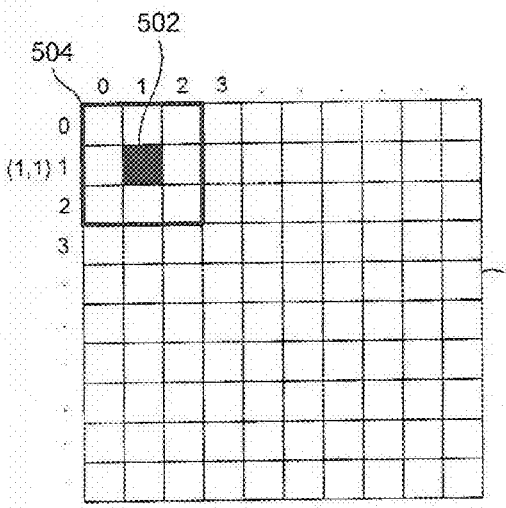
FIGS. 5A-D illustrate context usage during analysis and denoising of noisy signals.
Figure 5B:
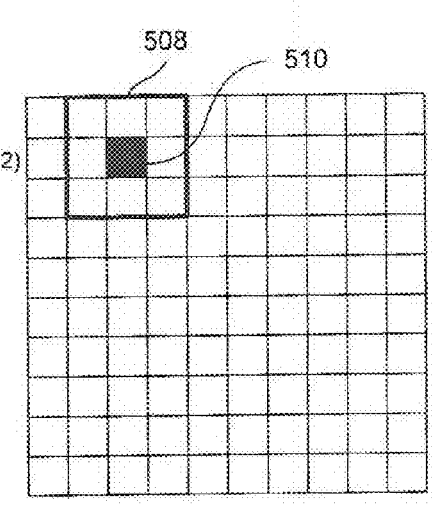
Figure 5C:
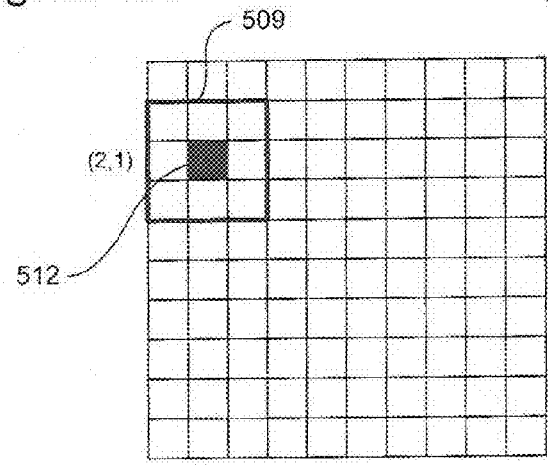
Figure 5D:
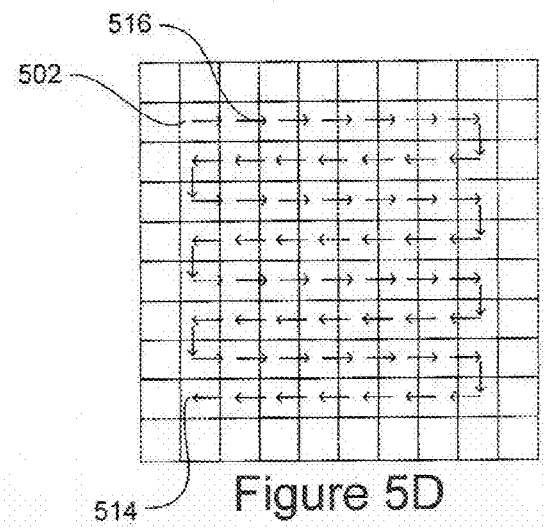

FIGS. 5A-D illustrate context usage during analysis and denoising of noisy signals. In FIG. 5A, the uppermost and leftmost symbol 502 with a full, 3×3 symbol context 504 within a small, square image 506 is shown. In certain types of analysis and denoising, special contexts are used for edge symbols, such as the first and last symbols of each row and column of the image. In other techniques, including the technique illustrated in FIGS. 5A-D, only symbols with full contexts are analyzed. FIGS. 5B and 5C show the 3×3 contexts 508 and 509 around the next rightmost symbol 510 and the next lowest symbol 512 with respect to symbol 502 in FIG. 5A. As shown in FIG. 5D, a given pass, or stage, of analysis or denoising may involve successive consideration of each full-context symbol within an image signal, starting with a first symbol 502 and proceeding to a final symbol 514. In FIG. 5D, small arrows, such as arrow 516, indicate each step of a pass in which each symbol is considered. In alternate techniques, all of the symbols within a signal may be considered, with specialized asymmetrical contexts employed for those symbols lacking a full context, or neighborhood.

Images are generally 2-dimensional data sets, and analysis and denoising methods for images therefore frequently use 2-dimensional contexts symmetrically disposed with respect to the central symbol. In other types of data sets, other types of contexts may be appropriate. For example, in digitally encoded text files, comprising essentially a one-dimensional series of symbols, a single length of symbols that include the central symbol may be employed as a context. Other types of signals may profitably employ more complex, non-contiguous or higher-dimensional contexts.

Figure 6:
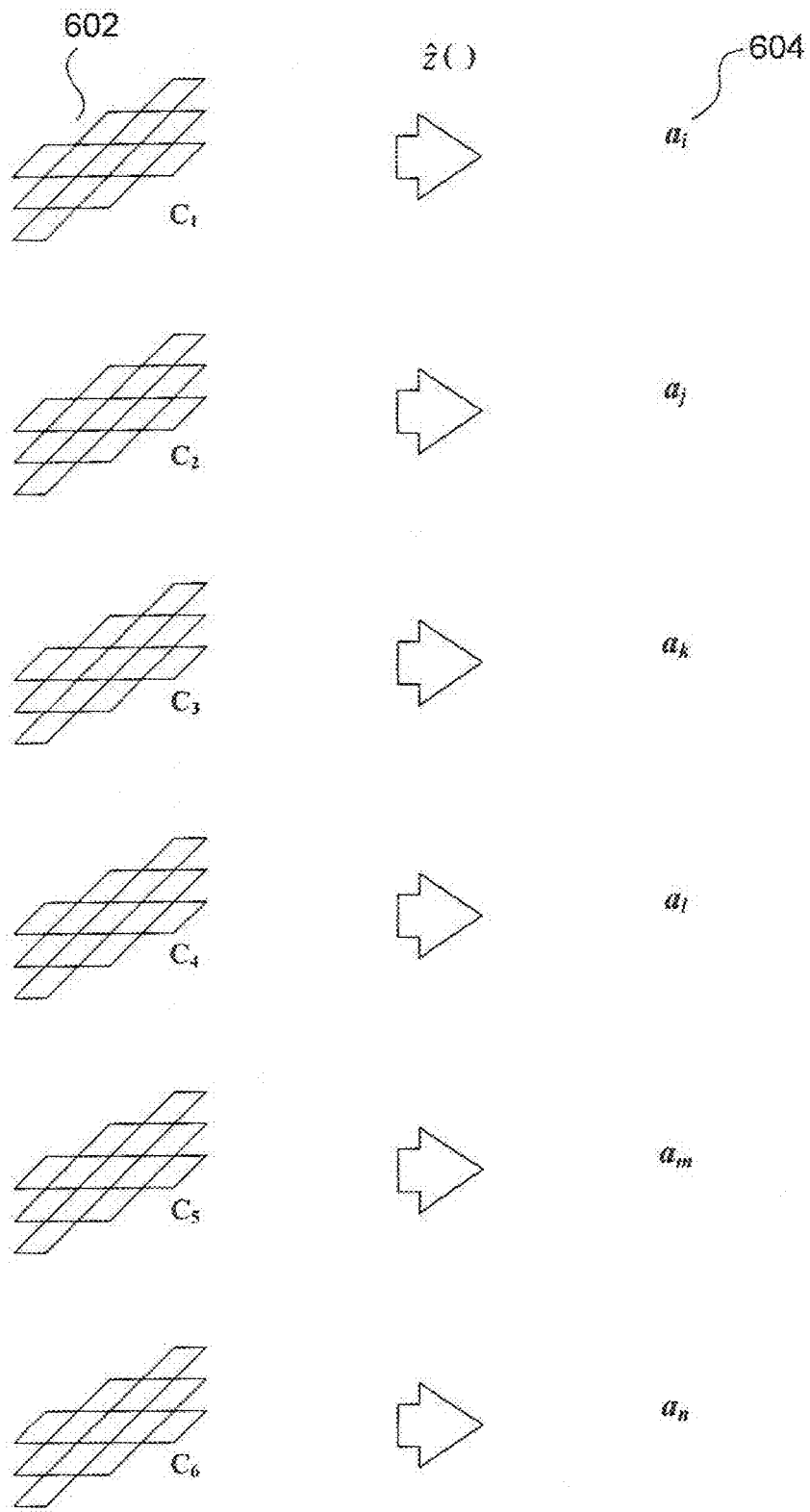
FIG. 6 illustrates the predictor function $\hat{z}(\ )$.

The DUDE-CTI method employs a central-symbol predictor function $\hat{z}(\ )$. FIG. 6 illustrates the predictor function $\hat{z}(\ )$. As illustrated in FIG. 6, the $\hat{z}(\ )$ function receives, as a sole argument, a context, such as context $C_I$ 602 in FIG. 6, from a noisy signal and returns a symbol 604 predicted to be the central noisy symbol. In other words, as shown in FIG. 6, for each possible context that may occur in a noisy signal, the predictor functions $\hat{z}(\ )$ returns a corresponding central symbol for the context.

The DUDE-CTI method computes an error $e_i$ for each symbol $z_i$ in the noisy signal as the difference between the observed symbol $z_i$ and the symbol predicted by the predictor function $\hat{z}(\ )$ for the context $C_i$ for the symbol $z_i$. FIG. 7 illustrates computation of an error $e_i$ for a symbol $z_i$ observed within a context $C_i$ observed in a noisy signal.

FIG. 8 illustrates accumulation of error information for a particular context during analysis of a noisy image signal.

The error-information accumulation in FIG. 8 is context specific. As discussed later, more efficient DUDE-CTI implementations use cluster-specific error-information accumulation. As shown in FIG. 8, a data structure, or vector, $q_{C_i}^T$ 802 is maintained for each possible context $C_i$ in order to count the occurrences of different possible error values computed for the context $C_i$ during analysis of a noisy image signal. If the predictor function $\hat{z}(C_i)$ predicts the symbol $a_j$ for context $C_i$, then, according to the error equation $e_i=z_i-\hat{z}(C_i)$, the error values that can be computed for context $C_i$ range from $a_1-a_j$ 804 to $a_n-a_j$ 806.

In a first pass of the DUDE-CTI denoiser, each symbol in a noisy image signal 808 is considered, and the error for each considered symbol is tabulated in the appropriate vector $q_C^T$ for that symbol. For example, in FIG. 8, an error $e_i$ 810 is computed from the first considered symbol $z_i$ 812 and associated context $C_i$, and the computed error $e_i$ is used to compute the position of a counter 814 within the vector $q_{C_i}^T$ 802 that is updated to reflect the occurrence of error $e_i$ in the noisy image signal 808. The computed error $e_i$ 810 can be viewed as being offset from a counter 816 within the vector $q_{C_i}^T$ 802 corresponding to a computed error of 0. As each symbol is considered during the first pass of the DUDE-CTI method, the vector $q_C^T$ corresponding to the observed context of the symbol is updated to reflect the occurrence of the error e computed from the symbol and context observed for the symbol within the noisy image signal. After the first pass of the DUDE-CTI method, each vector $q_C^T$ generally stores a histogram more or less symmetrically disposed about the counter within the vector $q_C^T$ corresponding to a computed error value e of 0. For example, in FIG. 8, the contents of the counters within vector $q_{C_i}^T$ 802 are plotted above the vector $q_{C_i}^T$ in a two-dimensional plot 818, and form a histogram with a central, highest peak 820 corresponding to the counter 816 within vector $q_{C_i}^T$ 802 representing a computed error of 0. In other words, the symbol predicted by the predictor function $\hat{z}( )$ for a given context $C_i$ is generally the symbol most often observed within the context $C_i$ in the noisy signal. Thus, following the first pass of the DUDE-CTI denoiser method, histograms of observed errors for each context are collected.

Unfortunately, when contexts of even modest size are used, a typical image will not contain a sufficient number of occurrences of each context to collect reliable, well-formed histograms of error occurrences, such as the histogram shown in FIG. 8. For this reason, the DUDE-CTI method employs context clustering in order to collect sufficient numbers of error occurrences for each context.

Figure 9:
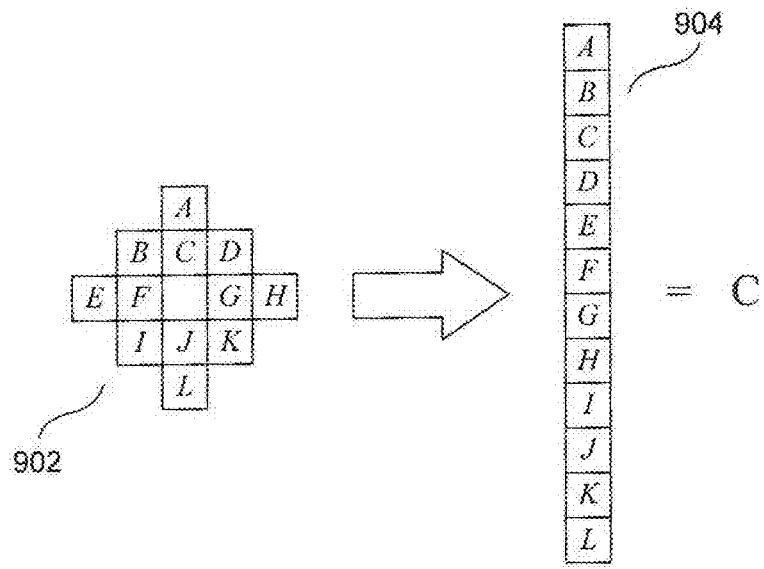
FIG. 9 illustrates a context vector.

FIG. 9 illustrates a context vector. It is convenient to consider context vectors for the mathematical steps of the DUDE-CTI method. As shown in FIG. 9, the symbols that occur within a context 902 may be ordered into a vector 904 according to some ordering method that is uniformly applied to all contexts. In FIG. 9, symbols A-L from 2-dimensional context 902 are re-ordered into a column vector 904 by a left-to-right, top-down traversal of the 2-dimensional context 902. The ordering method is arbitrary, and different ordering methods may be mathematically or programmatically convenient for different types of contexts. A context vector may be considered to be a row vector or a column vector, depending on conventions chosen for the analysis using the context vector. In other words, the convention is arbitrary.

Figure 10:
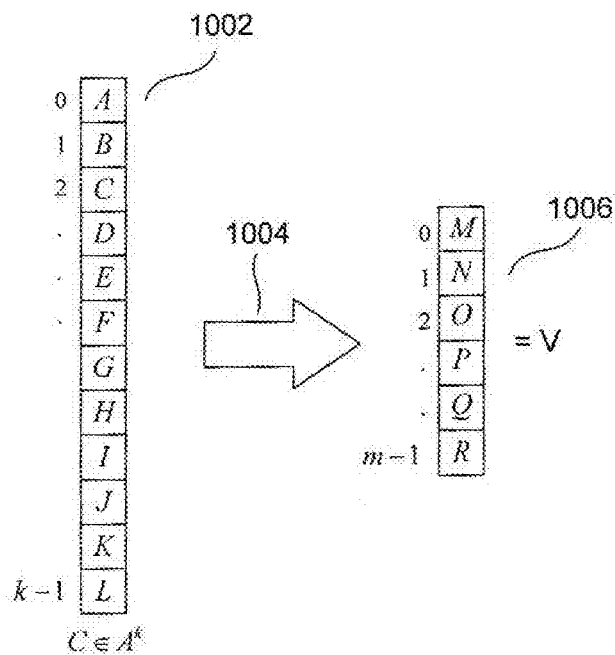
FIG. 10 illustrates a context-vector to cluster-index mapping.

Context clustering can be thought of as a many-to-one mapping, or binning, of context vectors in a context-vector space into a set of context-cluster indices. FIG. 10 illustrates a context-vector to cluster-index mapping. In FIG. 10, a context vector 1002 $C \in A^k$ of dimension k is mathematically transformed 1004 to a cluster index V 1006 with a range of values expressible using a sequence of m symbols over some alphabet (e.g. binary), where m is less than the dimension k of the context vector.

Figure 11:
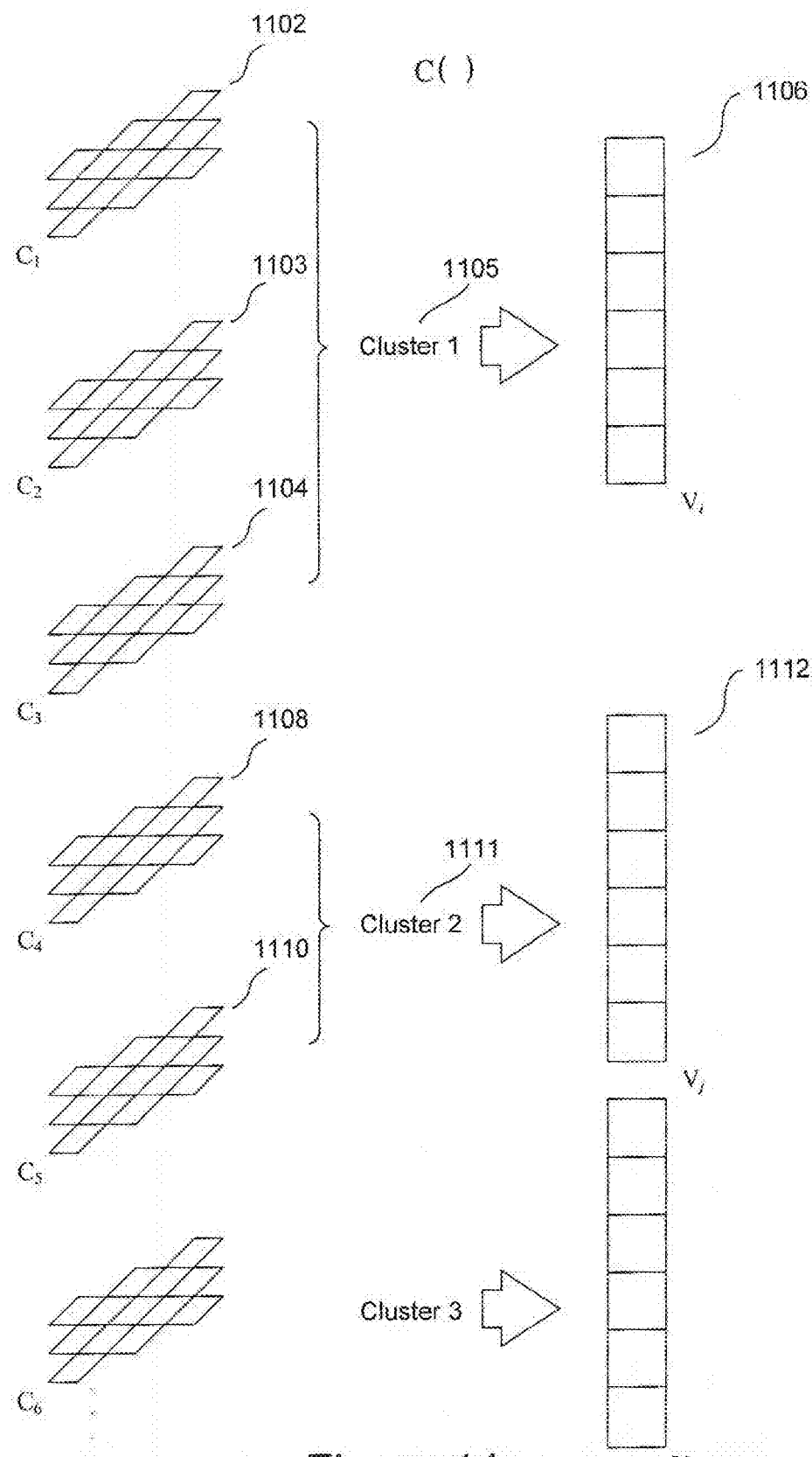
FIG. 11 illustrates a context-clustering function C( ) used by various embodiments of the DUDE-CTI denoising method.

FIG. 11 illustrates a context-clustering function C( ) used by various embodiments of the DUDE-CTI denoising method. As shown in FIG. 11, the context-clustering function C( ) maps a given context, supplied as a sole argument, that is expected to produce a particular type of error histogram to a particular cluster to which other contexts that are expected to produce similar error histograms may be mapped. The context is, in turn, mapped to a cluster index. Multiple contexts are generally mapped to any given cluster by the context-clustering function C( ). For example, in FIG. 11, three contexts 1102-1104 are mapped by the context-clustering function C( ) to Cluster 1 1105, in turn mapped to, or associated with, cluster index $V_i$ 1106. Similarly, contexts 1108 and 1110 are both mapped by the context-clustering function C( ) to Cluster 2 1111, in turn mapped to, or associated with, cluster index $V_j$ 1112. The number of contexts mapped to any particular cluster may vary, depending on the context-clustering function C( ). Any particular DUDE-CTI embodiment may use any of a number of different context-clustering functions, although suitable context-clustering functions generally have the property of mapping contexts expected to produce similarly shaped error histograms, such as the error histogram shown in FIG. 8, to a common cluster. In other words, all the contexts mapped to any particular cluster by a suitable context-clustering function would produce similarly shaped error histograms were the first pass of the DUDE-CTI method executed on a sufficiently large noisy image signal to collect sufficient occurrence counts of errors for each context to generate well-formed histograms for each context.

Figure 12:
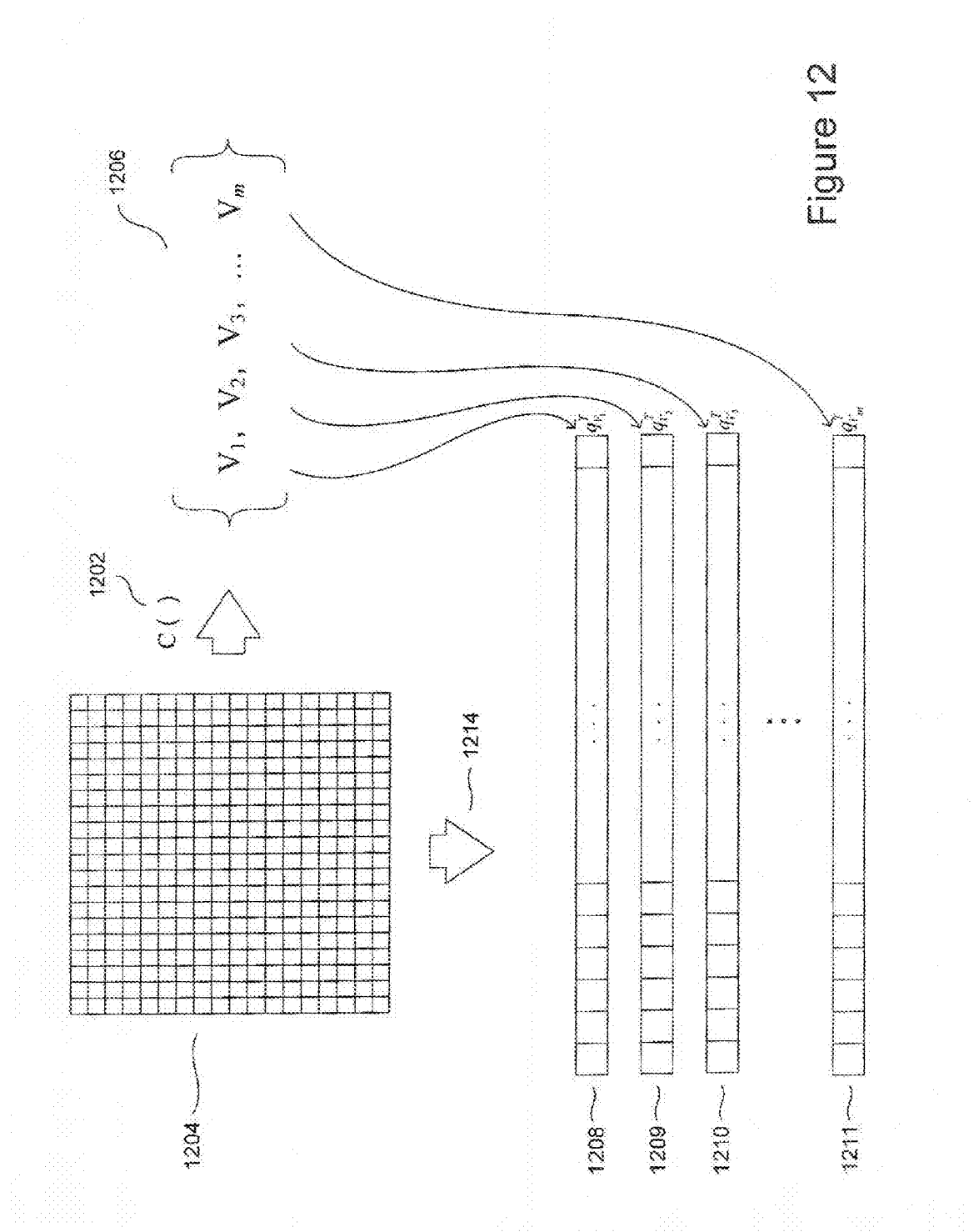
FIG. 12 illustrates the use of clustering by the DUDE-CTI method during a first pass, in which error histograms are prepared.

FIG. 12 illustrates the use of clustering by the DUDE-CTI method during a first pass, in which error histograms are prepared. As shown in FIG. 12, a context-clustering function C( ) 1202 is employed to map contexts occurring within a noisy image signal 1204 to a set of clusters 1206. Then, an occurrence-count vector $q_{V_i}^T$ 1208-1211 is instantiated and initialized for each possible cluster $V_i$. Finally, each symbol in the noisy image signal 1204 is analyzed 1214 in the first pass to compute and tabulate the occurrence of computed errors, on a cluster-by-cluster basis. The errors are computed as discussed above, with reference to FIGS. 7 and 8, except that all errors observed for all contexts that belong to a given cluster $V_i$ are commonly tabulated together in the vector $q_{V_i}^T$ for that cluster, rather than being separately tabulated in context-associated vectors $q_C^T$, as was done in FIG. 8. Thus, clustering allows a much larger number of error occurrences to be tabulated together in each histogram generated during analysis of a given noisy image signal. However, common tabulation of error occurrences in cluster-associated vectors $q_V^T$ is only meaningful if the shapes of the error histograms that would be separately produced for all contexts associated with the cluster are similar.

Figure 13:
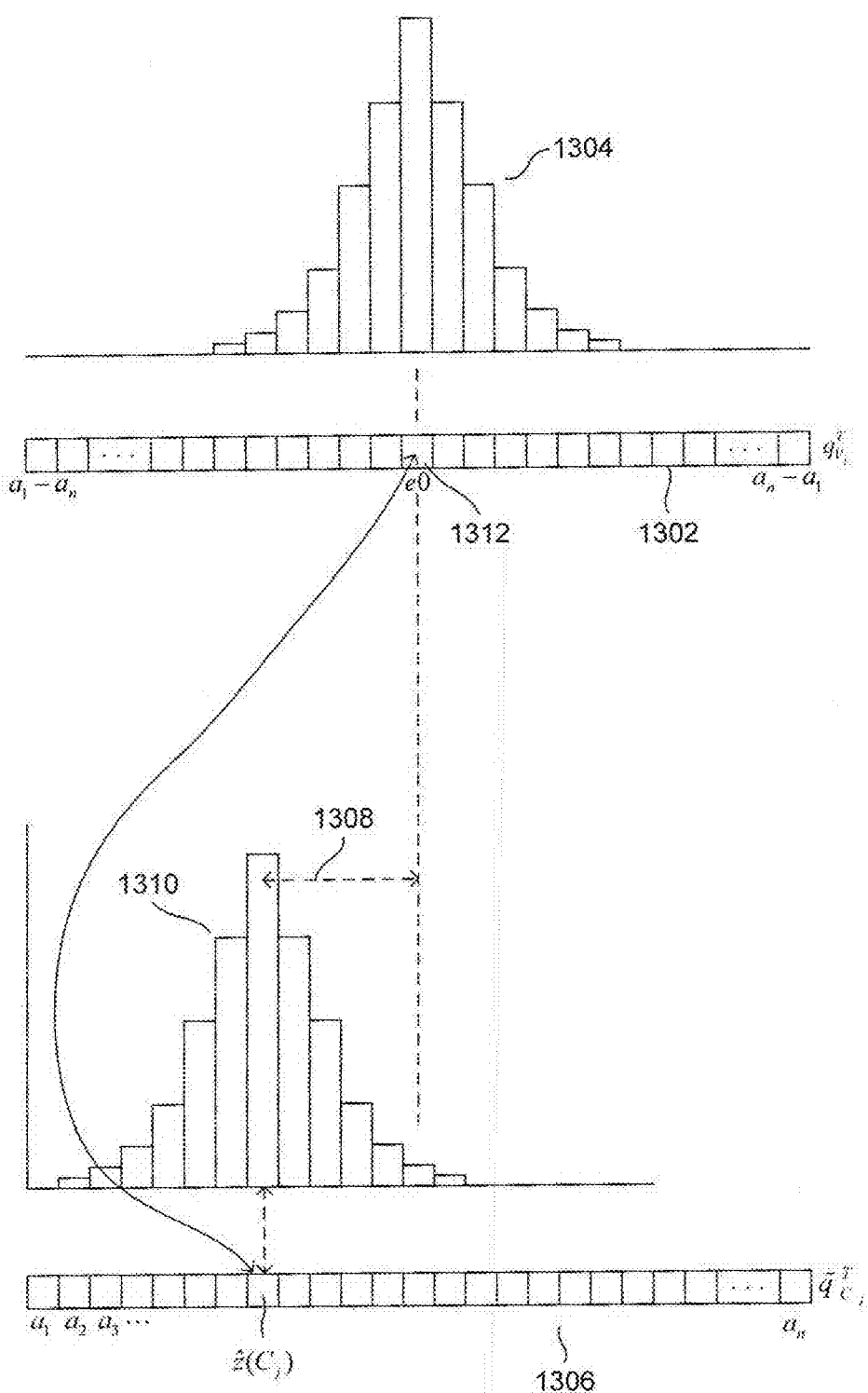
FIG. 13 illustrates generation of context-specific symbol-occurrence probability distributions $q_C^T$ from cluster-associated error-occurrence vectors $q_V^T$ collected during the first pass of a cluster-based DUDE-CTI method.

FIG. 13 illustrates generation of context-specific symbol-occurrence probability distributions $\tilde{q}_C^T$ from cluster-associated error-occurrence vectors $q_V^T$ collected during the first pass of a cluster-based DUDE-CTI method. In FIG. 13, a cluster-associated error-occurrence vector $q_{V_j}^T$ 1302 is shown at the top of the diagram, along with a histogram plot 1304 of the values stored in the counters within the cluster-associated vector $q_{V_j}^T$, using the illustration convention employed in FIG. 8. A context-specific symbol-occurrence probability distribution $\tilde{q}_{C_j}^T$ for a context $C_j$ associated with cluster $V_j$ 1304 is generated in FIG. 13 by copying the contents of the cluster-associated error-occurrence vector $q_{V_j}^T$ 1302 into the counters of context-associated context-specific symbol-occurrence probability distribution $\tilde{q}_{C_j}^T$. However, rather than copying the error-occurrence counts from cluster-associated vector $q_{V_j}^T$ into corresponding counters of context-associated context-specific symbol-occurrence probability distribution $\tilde{q}_{C_j}^T$, each copy involves an offset 1308, so that the context-specific probability distribution 1310 is centered about the symbol value $\hat{z}(C_j)$ predicted by the predictor function for the context, rather than centered at the position 1312 corresponding to a computed error of 0 in the cluster-specific histogram 1304. In other words, the final, context-specific vector $\tilde{q}_{C_j}^T$ represents a probability distribution for the occurrences of symbols $a_1, a_2, \ldots a_n$ from the alphabet A for all occurrences of the context $C_j$ in the noisy image signal, estimated from the probability distribution observed for the cluster to which the context is mapped by the context-clustering function C( ). The copy operation may therefore be accompanied by a normalization, to provide a normalized, estimated probability distribution, and a domain-related adjustment, since the domain of $q_{V_j}^T$ is generally twice as large as the symbol alphabet size n, which is the domain of $\tilde{q}_{C_j}^T$. Thus, the error-occurrence counts tabulated in common for each cluster are used to generate specific symbol-occurrence probability distributions $\tilde{q}_{C_j}^T$ for each context $C_j$.

Next, the DUDE-CTI denoiser generates a function g(C, z) that computes a replacement symbol $\hat{x}$ for a given central symbol z that occurs within context C observed in the noisy image signal. The replacement function g( ) can then be used in a second, symbol-by-symbol pass, to replace each symbol in the noisy image signal with a corresponding replacement symbol. The symbol replacement for each symbol in the noisy image signal is carried out independently. In other words, the contexts applied to the replacement function g( ) are the contexts observed in the noisy image signal, rather than partially symbol-replaced contexts. It should be noted that, in many cases, the replacement symbol $\hat{x}$ is identical to the corresponding observed symbol z in the noisy image signal.

Computation of the replacement function g( ) involves use of two matrices: (1) a matrix Π that represents a channel-noise model for the noise-inducing channel that generates symbol differences between the initial, clean image signal and the noisy image signal; and (2) a distortion matrix Λ that represents the distortions in a recovered image produced by substituting for symbol $a_i$ in the corresponding clean image signal any of the symbols $a_1, a_2, \ldots a_n$, in alphabet A.

Figure 14:
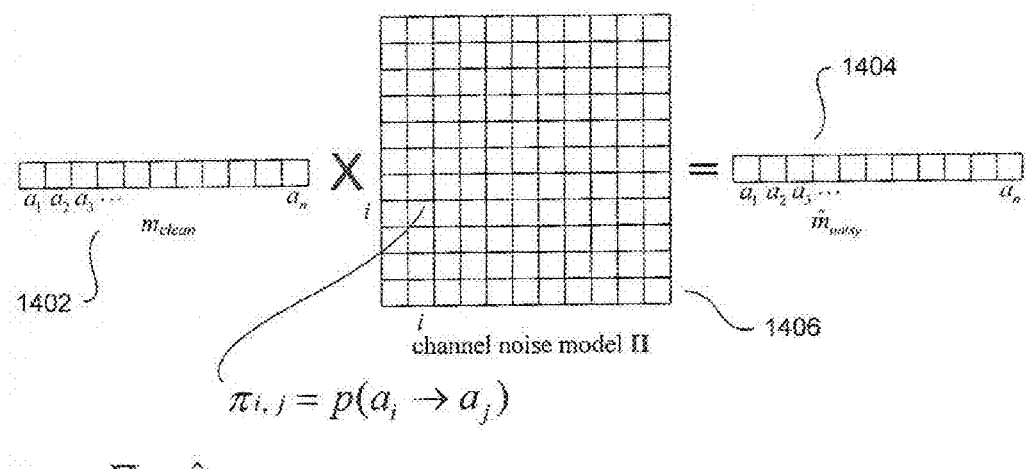
FIG. 14 illustrates a channel-noise-model matrix Π.

FIG. 14 illustrates a channel-noise-model matrix Π. In FIG. 14, the row vector $m_{clean}$ 1402 contains counts of the occurrences of each symbol in alphabet A within the clean, original image signal. The row vector $m_{clean}$ is indexed by symbols from the alphabet A, $a_1, a_2, a_3, \ldots$ A corresponding row vector $m_{noisy}$, contains the counts of occurrences of the symbols of the alphabet A in the noisy image signal. Multiplication of the row vector $m_{clean}$ by the channel-noise-model matrix Π 1406 produces a derived row vector $\hat{m}_{noisy}$ 1404. Each element $\pi_{i,j}$ of the channel-noise-model matrix Π contains the probability of the transition of the symbol $a_i$ to the symbol $a_j$ as the clean signal passes through the noisy channel modeled by the channel-noise-model matrix Π. In mathematical terms:

$$m_{clean}\Pi = \hat{m}_{noisy}$$

$$\hat{m}_{noisy}[i] = m_{clean}[1]\, p(a_1 \to a_i) + m_{clean}[2]\, p(a_2 \to a_i) + \ldots + m_{clean}[n]\, p(a_n \to a_i)$$

The derived vector $\hat{m}_{noisy}$ 1404 is expected to be fairly close, relative to the signal size, to the vector $m_{noisy}$ containing counts of symbols observed in a noisy signal. Provided that the channel-noise-model matrix Π is invertible, or an approximate or pseudo inverse of the matrix Π can be obtained by any of a number of matrix inversion methods, an observed vector $m_{noisy}$ including the counts of occurrences of symbols observed in a noisy signal can be multiplied by the inverse of the channel-noise-model matrix Π to produce approximate estimates of the probabilities of occurrences of symbols in the clean signal:

$$m_{clean} \cong m_{noisy}\Pi^{-1}$$

This approximation technique can be extended to vectors $\tilde{q}_{C_j}^T$ that include the derived probabilities of occurrences of symbols of the alphabet A observed in contexts $C_j$ in the noisy signal to produce estimates of probabilities of occurrence of symbols in the alphabet A in the clean signal corresponding to occurrences of the context $C_j$ in the noisy signal by multiplication of $\tilde{q}_{C_j}^T$ by the inverse of the channel-noise-model matrix Π, as follows:

$$\tilde{q}_{clean,C_j}^T \cong \tilde{q}_{C_j}^T \Pi^{-1}$$

Figure 15:
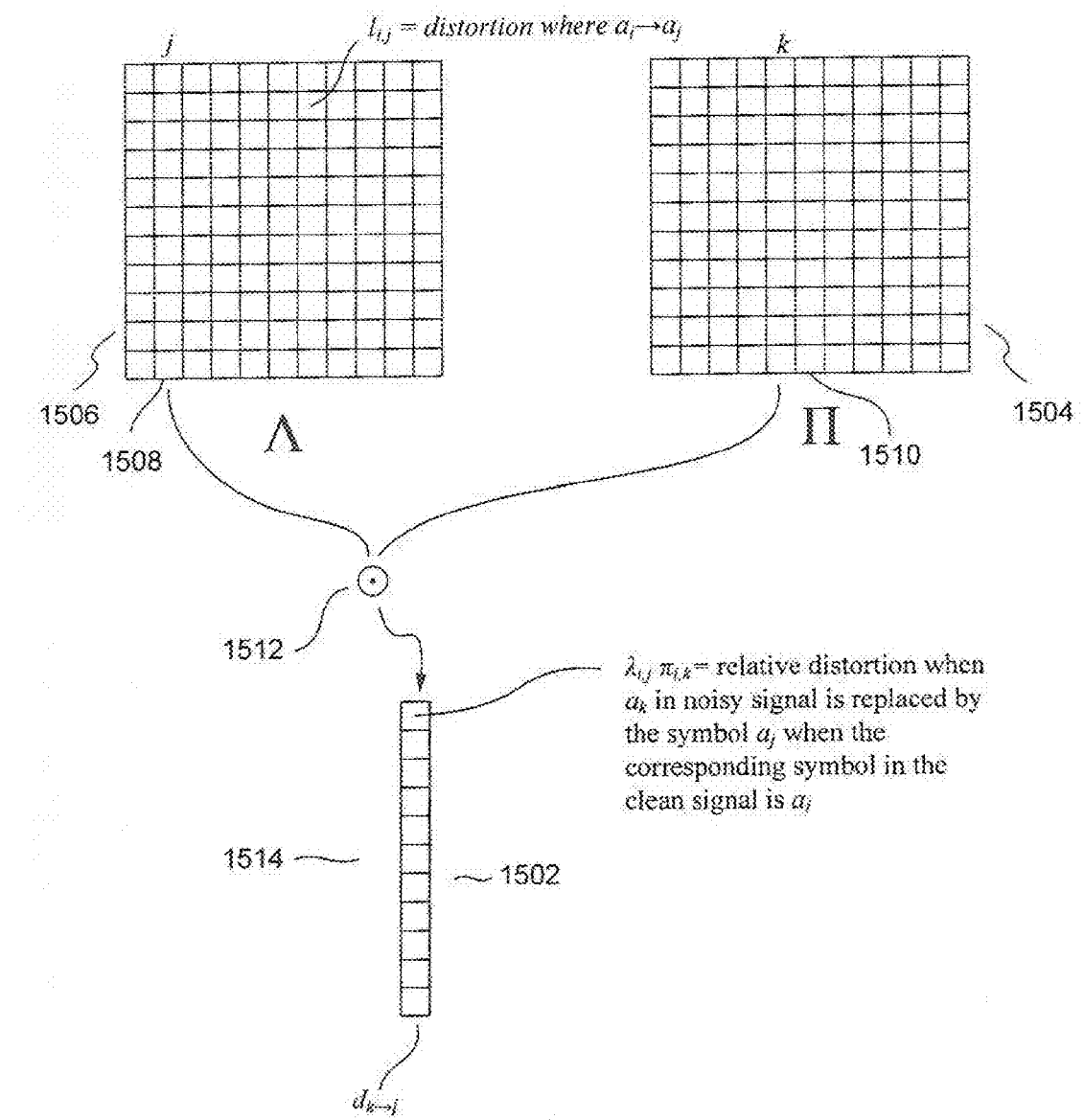
FIG. 15 illustrates construction of a relative distortion vector for replacement of a symbol $a_k$ in a noisy signal by a symbol $a_j$.

FIG. 15 illustrates construction of a relative distortion vector that numerically expresses the distortion expected from replacement of a symbol $a_k$ in a noisy signal by a symbol $a_j$. Construction of a relative distortion vector 1502 involves a column of the channel-noise-model matrix Π 1504, discussed above with reference to FIG. 14, as well as a column from the distortion matrix Λ 1506. Each element $\lambda_{i,j}$ in the distortion matrix Λ contains a numerical estimate of the distortion produced in an image when the symbol $a_i$ in the clean signal is replaced by the symbol $a_j$ in the noisy signal. When a column j 1508 is selected from the distortion matrix Λ and a column k is selected from the channel-noise-model matrix Π 1510, and the selected columns $\lambda_j$ and $\pi_k$ are combined by the Schur product operation 1512, the distortion vector $d_{k \to j}$ 1514 is produced. The Schur product is carried out by the multiplication of each element in the column $\lambda_j$ by the corresponding element in the $\pi_k$ column. Each element of the distortion vector $d_{k \to j}$, $\lambda_{i,j}\pi_{i,k}$, includes a numerical estimate of the relative distortion produced when symbol $a_k$ in a noisy signal is replaced by the symbol $a_j$ when the corresponding symbol in the clean signal is $a_i$.

FIG. 16 illustrates the computation of an estimate of the distortion produced by replacing symbol $a_k$ within context C in a noisy signal by the replacement symbol $a_j$. This distortion value is obtained by the inner product of the row vector $\tilde{q}_{clean,C}^T$ 1602 by the distortion column vector $d_{k \to j}$ 1604. Note that the row vector $\tilde{q}_{clean,C}^T$ is obtained, as discussed above, by multiplying the derived row vector $\tilde{q}_C^T$ by the inverse of the channel-noise-model matrix Π. Therefore, as shown in FIG. 16, a numerical estimate of the distortion produced by replacing the symbol $a_k$ within context C in a noisy signal by the symbol $a_j$ can be obtained entirely from the derived symbol occurrence frequencies within the noisy signal, the distortion matrix Λ, and the channel-noise-model matrix Π and its inverse $\Pi^{-1}$.

FIG. 17 illustrates a symbol-replacement function g(C,z). The symbol-replacement function g(C,z) computes a replacement symbol for an observed central symbol z within an observed context C. The observed central symbol and context are supplied as arguments to the symbol-replacement function g(C,z). The function g( ) considers each possible replacement symbol value for the central symbol of the context C and returns the estimated minimally distorting replacement character $\hat{x}$, where, for a given observed central symbol z within an observed context C:

$$\hat{x} = g(C, z) = \frac{\text{argmin}}{a_j: j = 1 \text{ to } n}(\hat{d}_{z \to a_j})$$

where, for $z=a_i$, $\hat{d}_{z \to a_j} = \hat{d}_{a_i \to a_j} = \tilde{q}_{clean,C}{}^T \cdot d_{i \to j}$ Thus, the symbol-replacement function g( ) produces a replacement character $\hat{x}$ for an observed central symbol z within a context C observed in the noisy signal.

Embodiments of the Present Invention

Embodiments of the present invention provide adaptive context-based prediction that can be parametrically adapted to characteristics of the noisy data from which values are predicted. Prior to discussing the context-based predictors, a denoising context in which the context-based predictors of the present invention find application is first provided.

Figure 18:
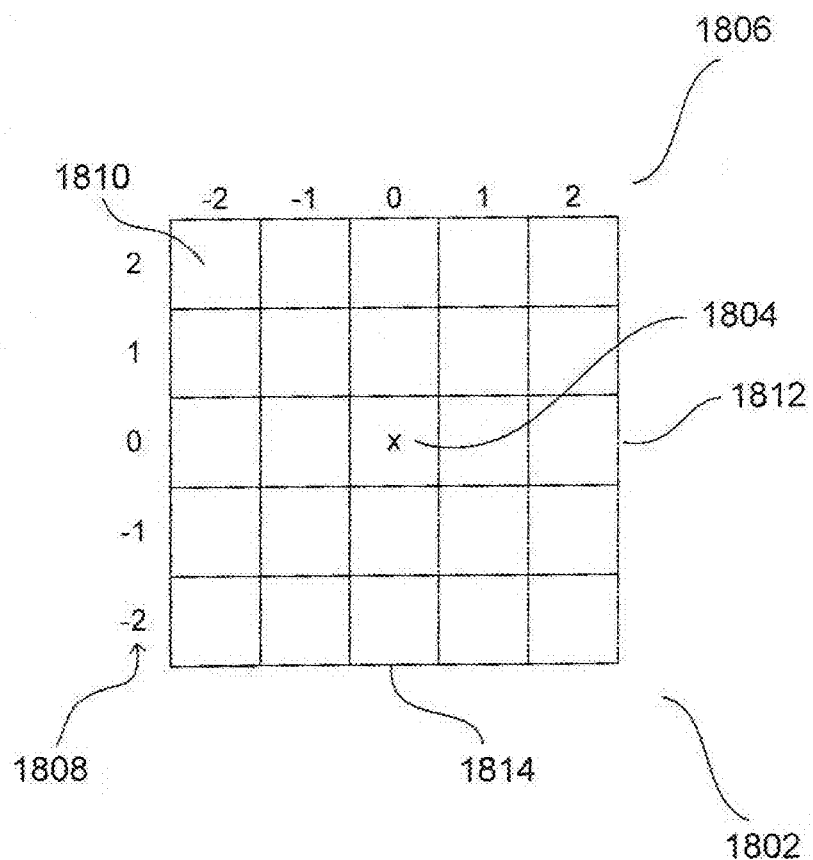
FIG. 18 illustrates a 5×5 context that is used as a basis for predicting a value corresponding to a context-embedded symbol in the described family of embodiments of the present invention.

FIG. 18 illustrates a 5×5 context that is used as a basis for predicting a value corresponding to a context-embedded symbol in the described family of embodiments of the present invention. As with the various alternative contexts, described in the preceding subsection, the 5×5 context 1802 shown in FIG. 18 is an abstract template that is superimposed over a central symbol "x" 1802 in a noisy image in order to define the local context within which the symbol "x" is embedded. The 5×5 context defines a symmetrical, square region of 24 symbols that surround the central symbol 1804. The central symbol "x" 1804 is not considered to be part of the context in which it is embedded. In FIG. 18, numeric indexing used to index each symbol within the context is shown above 1806 and to the left-hand side 1808 of the context 1804. Each symbol in the context is indexed in similar fashion to a point in two-dimensional Cartesian space defined by x and y axes. The symbol 1810, for example, has indices (−2,2), the first index of the pair relative to a horizontal axis 1812 comprising the central row of symbols within the context and the second index of the pair relative to a vertical axis 114 comprising the central column of symbols within the context. In the following discussion, a context may be considered to be a two-dimensional matrix, with two indices used to indicate a particular element of the context, or, equivalently, a one dimensional vector with a single index, with the one-dimensional vector constructed by, as one example, concatenating rows or columns of the two-dimensional matrix in a particular order. The two indices for the matrix representation or single index for a vector representation are provided within parentheses, and shown as a subscript to a context symbol, such as "$C_{(-1, 1)}$." The context symbol can also be used to describe a context-generating function that generates a context for a particular symbol within a dataset:

$$C_i^j = C^j(j_i)$$

where $C_i^j$ is the context selected to embed symbol $j_i$ from image or dataset j; and $C^j(\ )$ is a function that generates context $C_i^j$ for dataset j symbol $j_i$.

Figure 19:
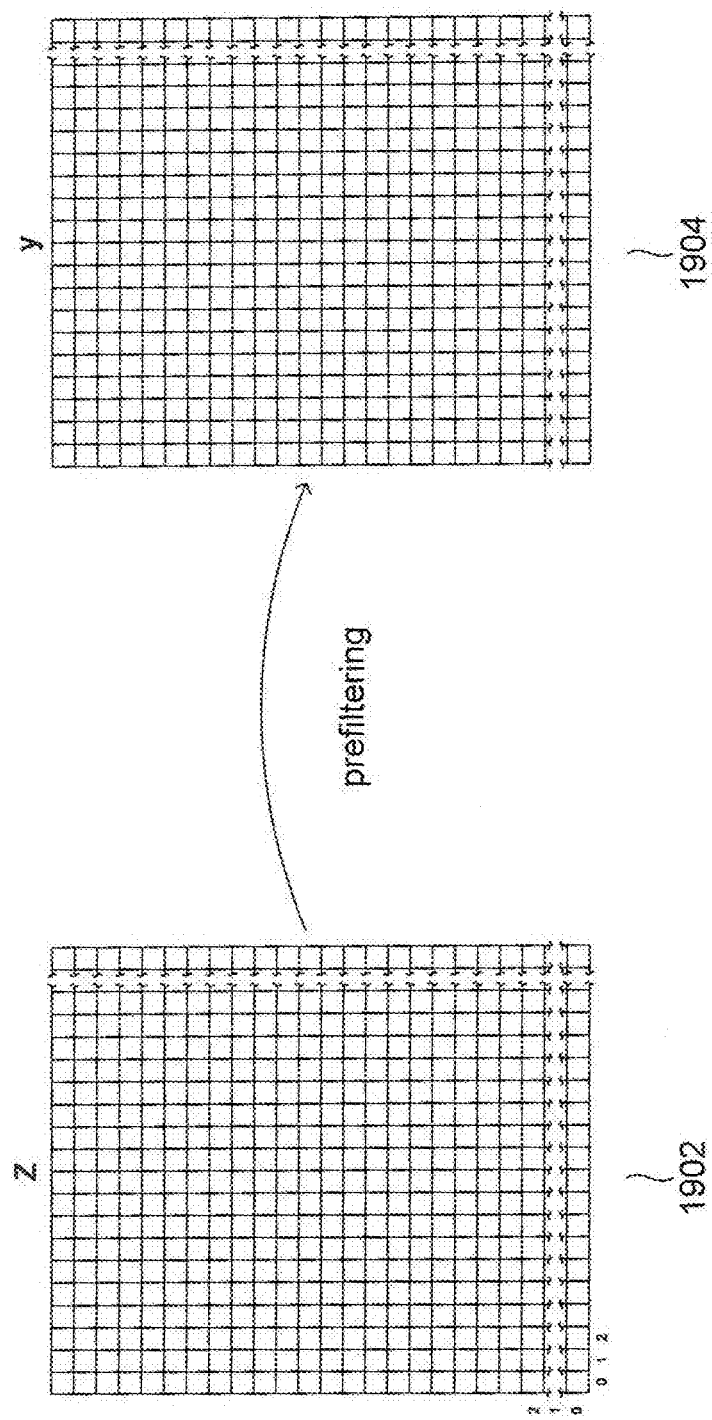
FIG. 19 illustrates an initial step in a discrete-universal denoising method in which embodiments of the present invention are applied.

FIG. 19 illustrates an initial step in a discrete-universal denoising method that represents an embodiment of the present invention. In the current discussion, the noisy data set on which methods of the present invention operate is considered to be a two-dimensional image, denoted as z, with elements $z_i$. In FIG. 19, the noisy image z 1902 is shown on the left side of the figure. The two-dimensional noisy image can be considered to be a two-dimensional matrix, with elements z(i,j) where i is a row index and j is column index. However, a two-dimensional image can be alternatively considered to be a one-dimensional vector z with elements $z_i$. For example, rows of the two-dimensional image may be concatenated together, in row order, to produce the vector z. When convenient, noisy image z may be treated as a two-dimensional matrix, or, at other times, treated as a one-dimensional vector, with the notation z and $z_i$ used for both. The same convention is used for describing filtered, denoised, and clean images and contexts within images.

In an initial step in certain denoising methods, a noisy image z is filtered to produce a prefiltered, noisy image y 1904. Both z and y generally have the same number of elements. The prefiltering step can be carried out in a variety of different ways. In one approach, a neighborhood, or context, about each pixel is considered, and a prefiltered-image symbol $y_i$ is predicted, or generated, from the image-element values, or pixel values, in a context or neighborhood surrounding each noisy-image pixel $z_i$ using one of various different filtering methods. The filtering methods can be described as computing the prefiltered-image symbol $y_i$ corresponding to noisy-image symbol $z_i$ as a function of the neighborhood $\eta_i$ about noisy-image symbol $z_i$:

$$y_i = f(\eta_i)$$

where $\eta_i$ is the neighborhood of element $z_i$ in noisy image z.

Prefiltering generally removes or ameliorates certain types of noise corruption in a noisy image. One example of a prefiltering function is a function that averages all of the values of image elements in the neighborhood of noisy-image element $z_i$ to compute corresponding prefiltered-image symbol $y_i$. An averaging type of prefiltering may be effective for certain types of images, but may be deleterious for others, including images that contain sharp detail and high-contrast features, such as edges. In certain cases, an appropriate prefiltering function may be selected, by method embodiments of the present invention, based on criteria that depend on the type of noisy image z that is sought to be denoised. The prefiltered image y is primarily used for generating context classes, symbol prediction, and bias estimation for prediction classes.

Figure 20:
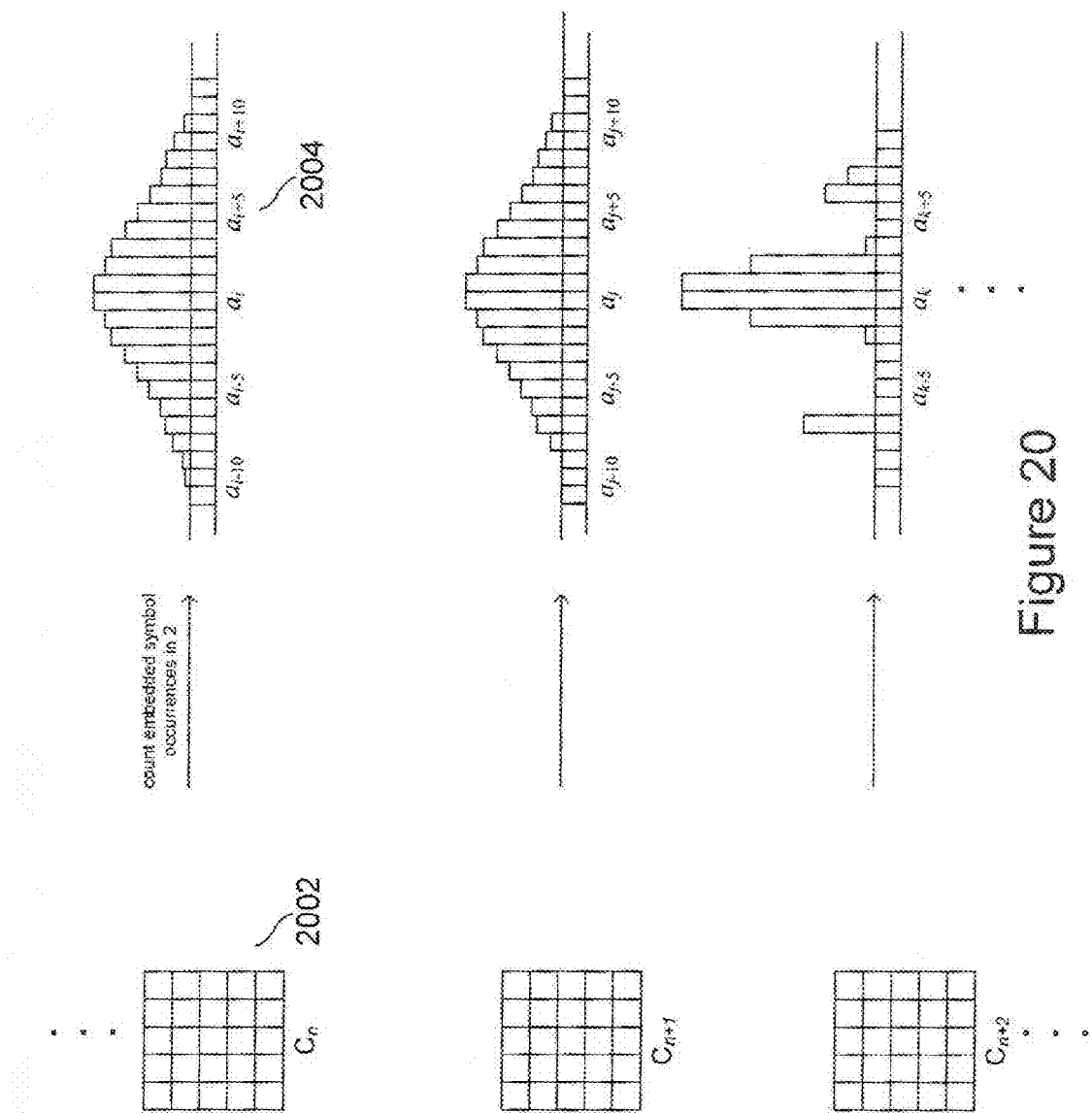
FIGS. 20-22 illustrate the concept of prediction classes and conditioning classes.
Figure 21:
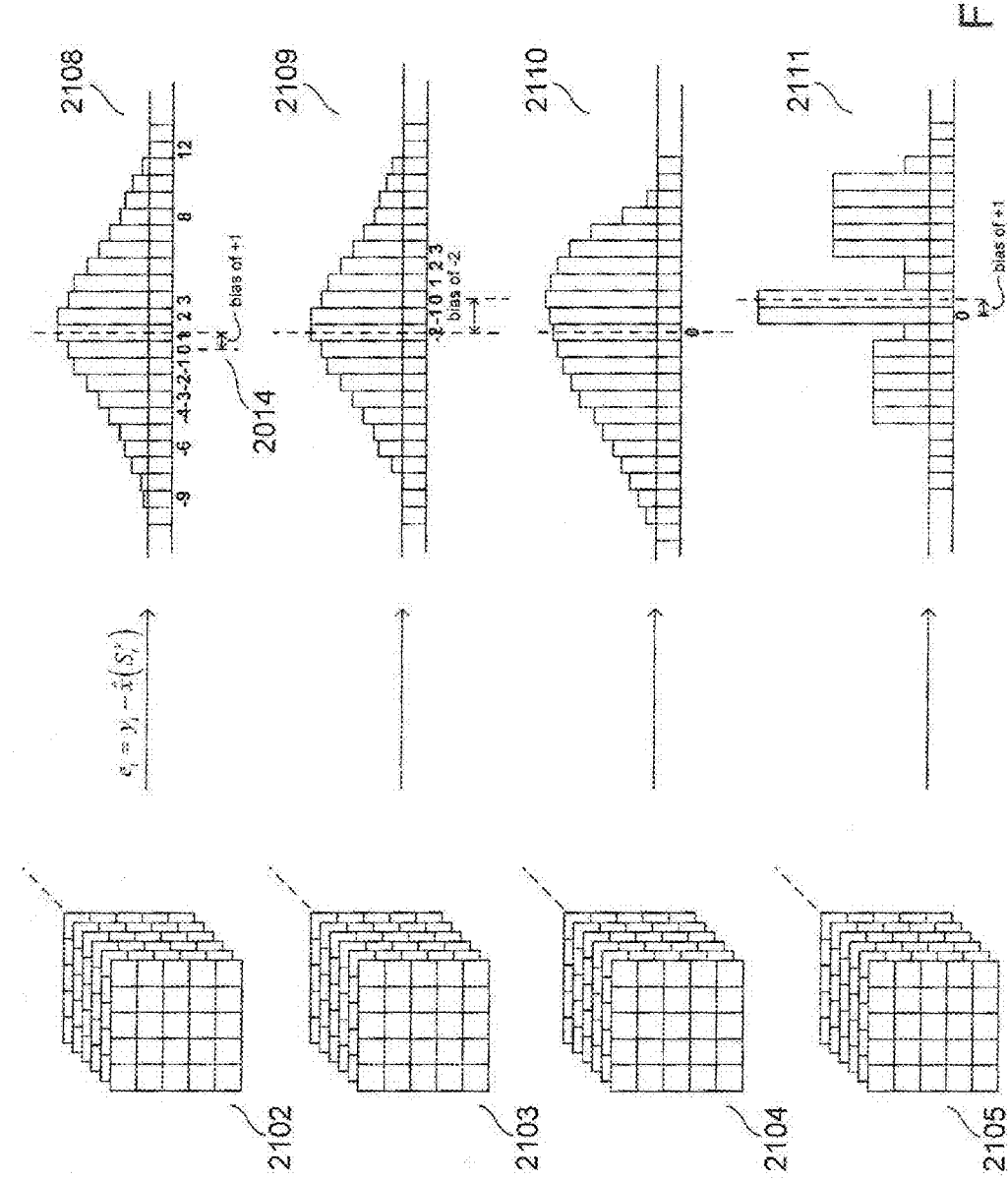
Figure 22:
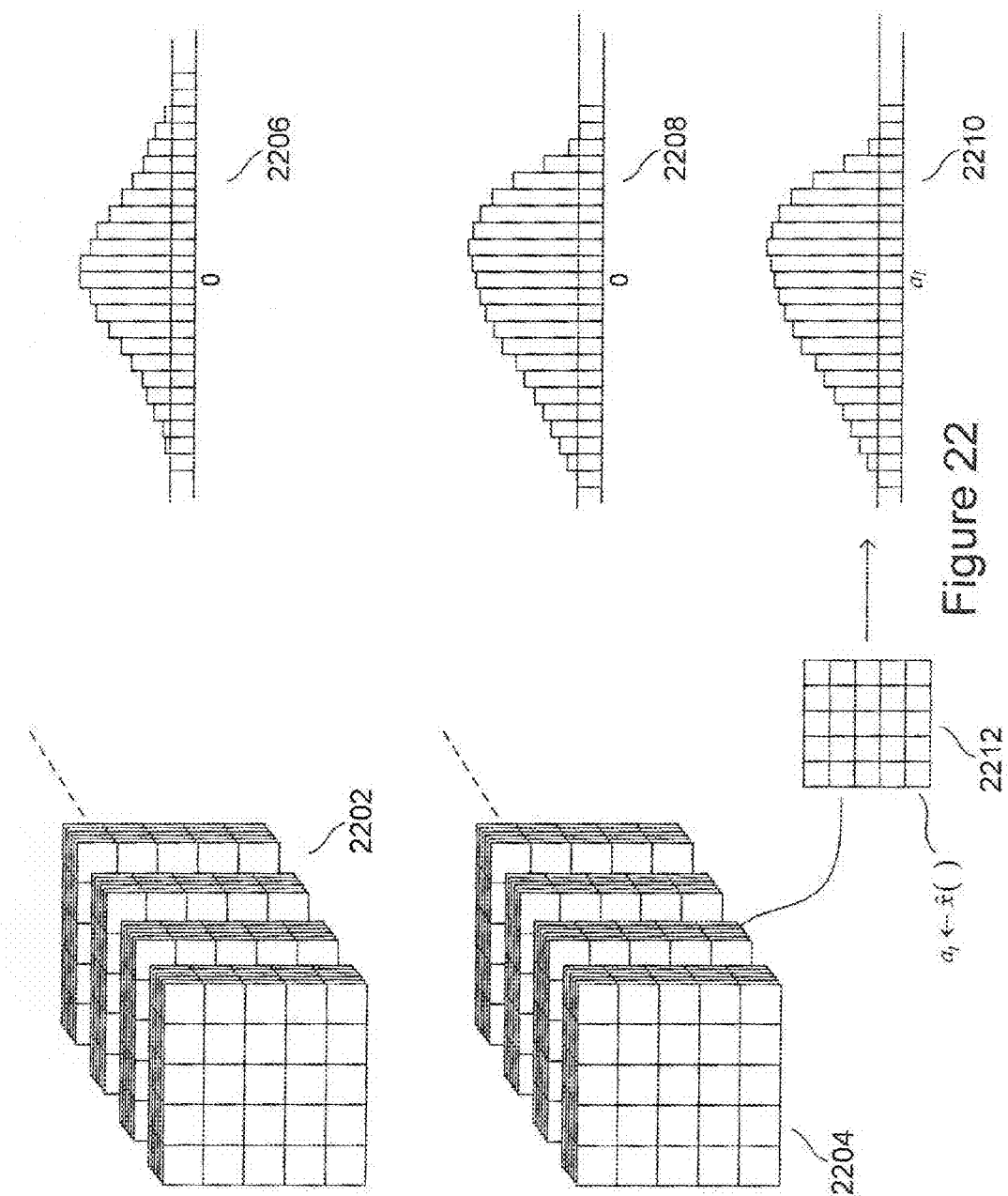

FIGS. 20-22 illustrate the concept of prediction classes and conditioning classes. As shown in FIG. 20, each different context that occurs in an image, such as context 2002, would be expected to generate a corresponding symbol-occurrence distribution, such as symbol-occurrence distribution 2004, were the context to occur a sufficient number of times in the image. However, as one example, for a grayscale image, in which each pixel value is selected from the range {0, 1, . . . ,255}, the number of 5×5 contexts, each of which includes the 24 symbols other than the central symbol, is $256^{24}$. Were these possible different contexts to be of equal probability of occurrence within an image, the probability that any given context would occur even a single time within the image would be vanishingly small. Even for decidedly non-uniform context-occurrence probability distributions, there are nonetheless generally far too few occurrences of most contexts to generate statistically meaningful symbol-occurrence distributions, such as those shown in FIG. 20, for individual contexts.

In order to achieve meaningful levels of observables, contexts are grouped into various types of context classes. FIG. 21 illustrates prediction classes into which individual contexts are grouped. In FIG. 21, four prediction classes 2102-2105 are shown associated with four corresponding prediction-error distribution 2108-2111. All of the contexts within a prediction class are assumed to exhibit similar prediction-error distributions. Various different techniques may be used to group contexts together into prediction classes. In general, the context groupings are estimates derived from numerical procedures based on assumptions of the distribution of pixel values in images. For example, for particular types of images, assumption of continuity of pixel-value trends along arbitrary directions within the image may be assumed. Additional assumptions may include symmetry-based assumptions and/or pixel-value-scaling based assumptions. A first prediction traversal of the image is used to accumulate distributions of prediction errors for each prediction class. A symbol $\tilde{x}_i$ is predicted for each prefiltered-image symbol $y_i$ using a prediction function $\tilde{x}(S_i^{y_i})$, where $S_i^{y_i}$ is the prefiltered-image context in which prefiltered-image symbol $y_i$ is embedded. A prediction error, $y_i - \tilde{x}(S_i^{y_i})$, is then computed for each predicted symbol $\tilde{x}_i$. The errors are accumulated, in a histogram, for each prediction class. By computing predictions errors from prefiltered-image symbols, rather than from noisy-image symbols $z_i$, as in the above-described DUDE and DUDE-CTI methods, a significant amount of noise distortion in contexts and in prediction-error statistics is avoided. Accumulation of prediction errors for all of the contexts in a prediction class is possible because, although each context in a prediction class may predict a different symbol, the predicted error $y_i - \tilde{x}(S_i^{y_i})$ depends only on the 0-centered prediction-error distribution common to all contexts within the prediction class. However, despite an assumption that the prediction-error distributions are centered about 0, it is often observed, as shown in FIG. 21, that the observed prediction-error distributions are slightly shifted, or biased, with a non-zero mean prediction error. For example, the prediction-error distribution 2108 exhibits a bias 2014 of 1, since the mean prediction error is 1.

The biases estimated from the prediction-error distributions accumulated for each prediction class, in the first traversal of the image, are used to correct the predicted values so that prediction classes can be grouped into larger conditioning classes for conditioning-class statistics collection in a second traversal of the image. FIG. 22 illustrates conditioning classes. In FIG. 22, two conditioning classes 2202 and 2204 are shown with associated prediction-error distributions 2206 and 2208. Because of the bias corrections, the prediction-error distributions for the conditioning class are correctly distributed about 0. In general, a sufficient number of contexts are grouped within each conditioning class to obtain a common, statistically meaningful prediction-error distribution for each conditioning class. As shown in FIG. 22, the symbol-occurrence probability distribution 2210 for a particular context C 2212 of a conditioning class can be obtained by centering the conditioning-class prediction-error distribution about the symbol predicted from the context C by the prediction function prediction function $\tilde{x}(C)$ and normalizing the distribution.

Figure 23A:
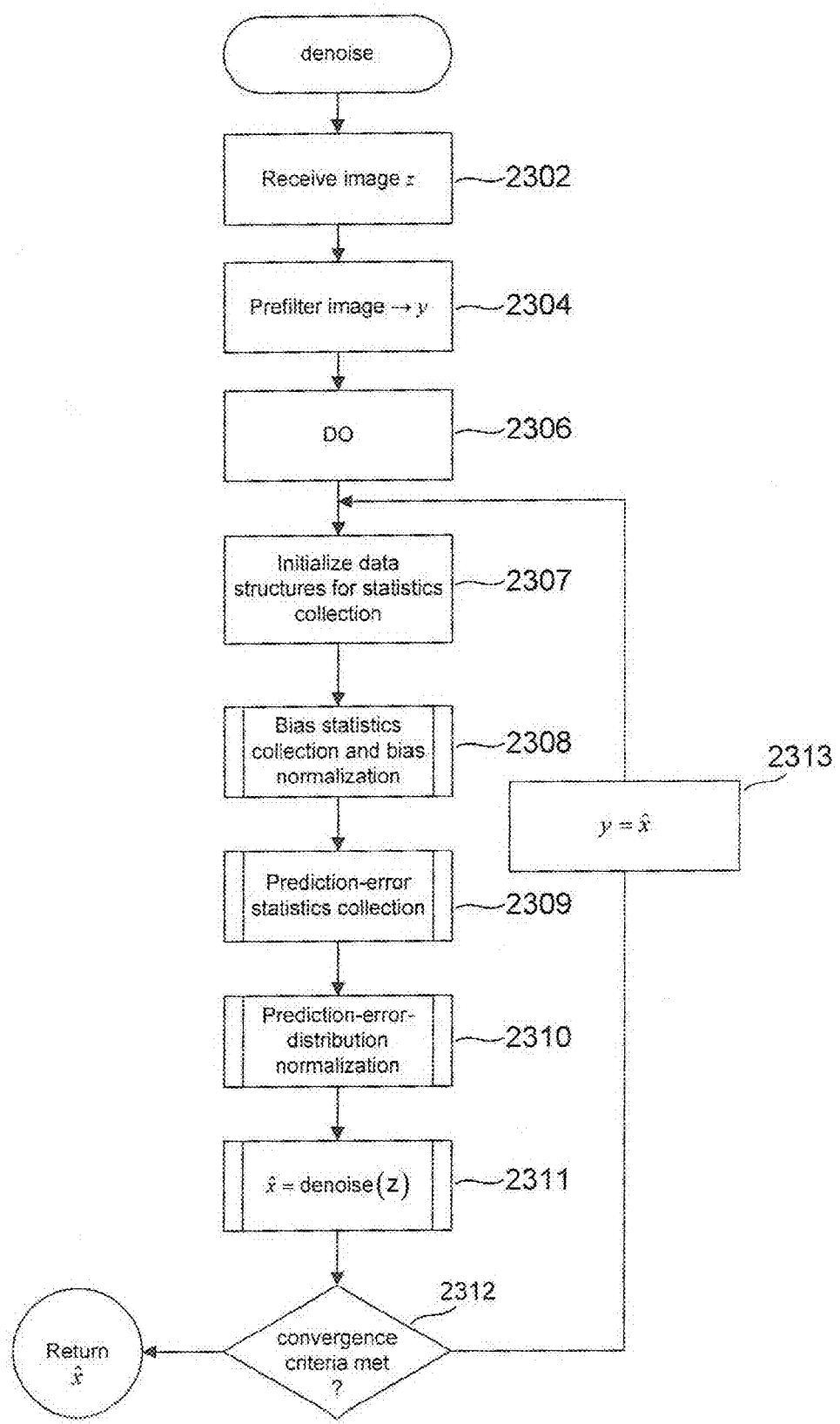
FIGS. 23A-B provide control-flow diagrams for an iterative enhanced discrete-universal denoiser.
Figure 23B:
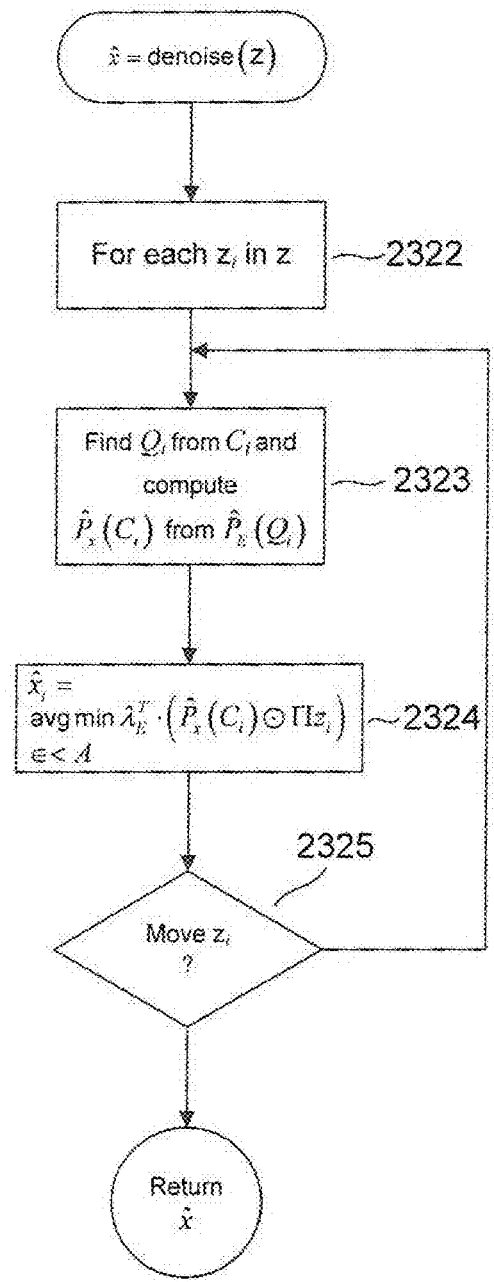

FIGS. 23A-B provide control-flow diagrams for an iterative enhanced discrete-universal denoiser. In FIG. 23A, the routine "denoise" is illustrated, in a control-flow diagram. In step 2302, a noisy image z is received. In step 2304, the noisy image z is prefiltered, as discussed above with reference to FIG. 19, to produce a first prefiltered image y. Then, in the do-while loop of steps 2306-2313, the noisy image is iteratively denoised until one or more convergence criteria for the denoising method are met, as determined in step 2312. In the current iteration, data structures for statistics collection are initialized in step 2307. Then, bias statistics are collected and bias normalization is carried out in step 2308. The biases computed in step 2308 allow for accurate combination of prediction classes to generate larger conditioning classes for which prediction-error statistics are collected in a second statistics-collection phase, in step 2309. In steps 2309 and 2310, prediction-error statistics are collected and analyzed for each conditioning class in order to generate symbol-prediction-error distributions for each conditioning class. Once these statistics have been collected and normalized, and prediction-error distributions have been generated for each conditioning class, then, in step 2311, a denoised image $\hat{x}$ is generated from the noisy image z. When the one or more global convergence criteria have been satisfied, as determined in step 2312, then the current, denoised image $\hat{x}$ is returned as the denoised image. Otherwise, the current denoised image $\hat{x}$ becomes the prefiltered image for a next iteration of the do-while loop, in step 2313.

FIG. 23B provides a flow-control diagram for step 2311 in FIG. 22. Denoising of the noisy image z to produce the estimated clean image $\hat{x}$ is carried out in the for-loop of steps 2322-2325. In this for-loop, each symbol $z_i$ in noisy image z is considered. In step 2323, the context class $Q_i$ is determined from the context $C_i^y$ in prefiltered image y for currently considered noisy-image symbol $z_i$, where the context $C_i^y$ is the context in the prefiltered image y aligned with element $z_i$ in a noisy image z. A context-specific symbol-prediction-error distribution $\hat{P}_X(C_i)$ is generated from the context-class prediction-error distribution $\hat{P}_{E(Q_i)}$, which is used, in step 2324, along with columns of the channel-noise-model matrix Π and the distortion matrix Λ to generate the denoised-image symbol $\hat{x}_i$ corresponding to currently considered noisy-image element $z_i$. The for-loop of steps 2322-2325 continues until all $z_i$ in noisy image z are considered, and corresponding denoised-image symbols $\hat{x}_i$ generated.

Embodiments of the present invention provide a context-based predictor that can be applied to each context-embedded symbol within an image, or other data, in order to predict a value $\hat{x}_i$ corresponding to a noisy-image symbol $z_i$ embedded within a context $C(y_i)$. In one application, the context-based predictor is applied to a noisy image or other noisy data, in order to generate a corresponding filtered image, which is used to compute prediction errors and obtain statistics on prediction errors. Often, the value $\hat{x}_i$ is itself a symbol from the alphabet that includes the noisy-image symbols $z_i$. However, certain context-based predictors predict non-symbol values, and these non-symbol values may be later processed to generate corresponding predicted symbols.

The noisy channel that affects the clean datasets may indeed constitute electronic transmission through a communications medium, but may also be any of a wide variety of different electronic and electromechanical processes that introduce noise into the data. For the purpose of describing embodiments of the present invention, the datasets on which described context-based predictors are applied, below, are referred to as images, and the contexts used for prediction are two-dimensional square contexts appropriate for two-dimensional images. However, it should be understood that alternative embodiments of the present invention may be applied to a wide variety of other types of datasets and data, including single-dimensional audio and numeric data as well as three-dimensional images, graphics, numerical, and symbolic data and higher-dimensional datasets. In addition, many different types of contexts may be employed, in addition to the square contexts discussed below. As discussed in the preceding subsection, the term "symbol" is a generic term that refers to an element of a dataset, and does not necessarily refer to graphical symbols, such as text characters. 8-bit and 16-bit pixel values of a stored image, for example, are both examples of symbols, as are 8-bit and 16-bit numerical encodings of text symbols.

A number of predictors are currently used for filtering, noise removal, and general image enhancement. A predictor can be thought of as a process that is carried out on a context C(x) within a data set j to produce a value x̂:

$$\hat{x} = F(C^j(x))$$

where $C^j(x)$ is the context of a symbol x in an image j; and
  x̂=the predicted value of x.
When the dataset from which contexts are chosen is understood from context, or irrelevant, the superscript on the context may be omitted.

One simple predictor $F_a$ involves summing all of the numerically encoded symbols within the context and dividing the sum by the number of symbols in the context:

$$\hat{x} = F_a(C(x)) = \frac{\sum_{i,j \in \{-\frac{M-1}{2}, \ldots, \frac{M-1}{2}\}} C(x)_{(i,j)}}{M^2 - 1}$$

where M=number of symbols along one side of the square context C; and
  M is assumed to be odd.
The simple predictor $F_a$ can be quite effective, in certain circumstances, and much less effective in others. Note that a similar predictor can be specified for contexts with an even number of rows and columns, using a different row-and-column indexing system that does not assume a central row and column and different limits on the values of the indexes i and j.

A number of exemplary contexts are next used to illustrate operation of the simple predictor $F_a$. FIGS. 24A-B, 25A-B, 26A-B, and 27A-B illustrate four exemplary contexts and prediction for centrally-embedded symbol by the predictor $F_a$ for the four exemplary contexts. Tables 1-4 show numeric values for the contexts, assumed to be superimposed on a two-dimensional, unsigned-byte-encoded grayscale image.

Table 1, below, is a first exemplary context, including numeric values for the symbols within the context, along with the embedded, central value predicted by predictor $F_a$ shown within a circle.

TABLE 1

| 25 | 50 | 75 | 100 | 125 |
|---|---|---|---|---|
| 25 | 50 | 75 | 100 | 125 |
| 25 | 50 | (75) | 100 | 125 |
| 25 | 50 | 75 | 100 | 125 |
| 25 | 50 | 75 | 100 | 125 |

Figure 24A:
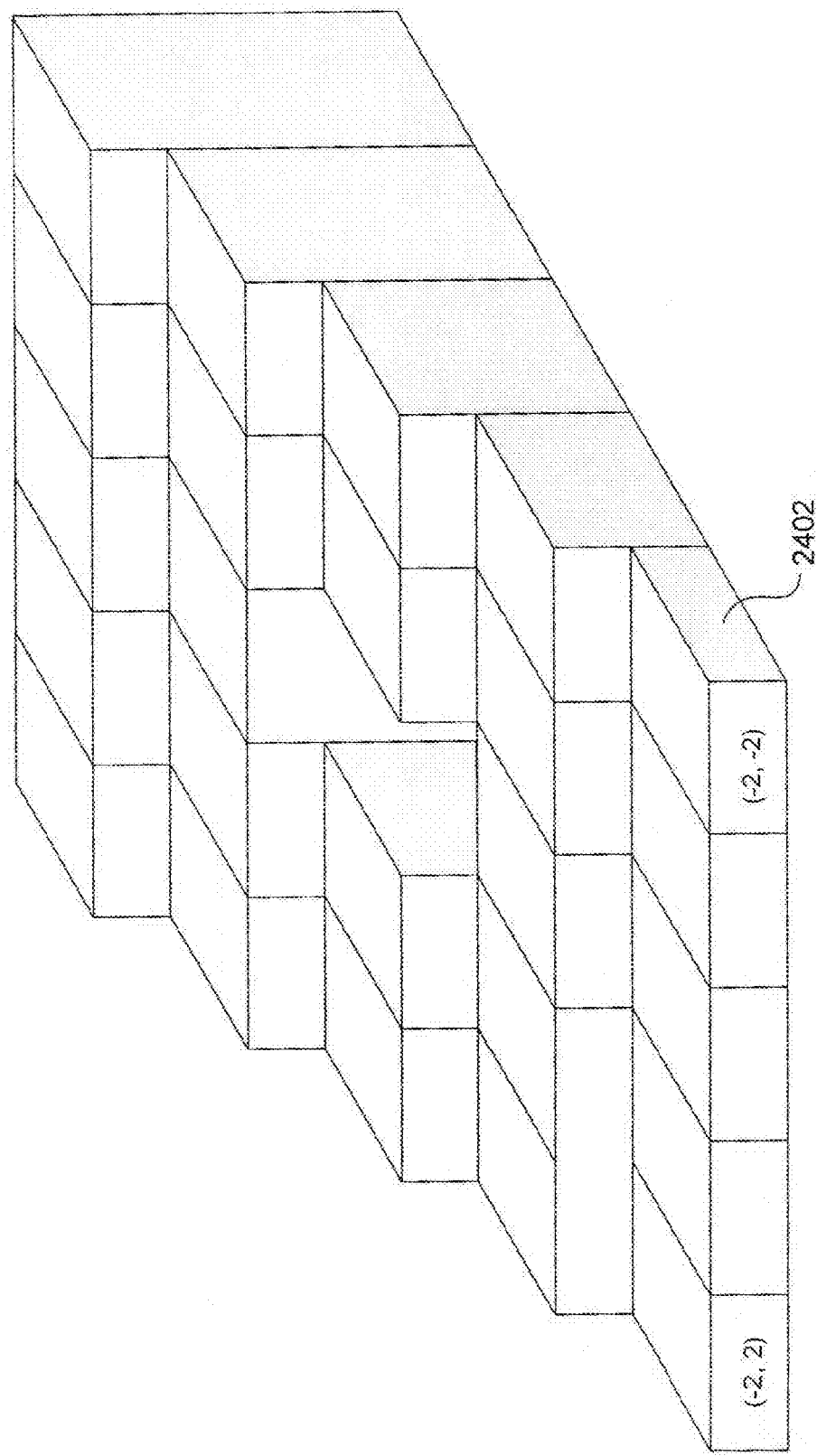

FIGS. 24A-B illustrate, in three-dimensional plots, the context prior to prediction of the embedded symbol, in FIG. 24A, and the context including the predicted, central symbol, in FIG. 24B. In FIGS. 24A-B, and in subsequent three-dimensional renderings of contexts shown in FIGS. 25A-B, 26A-B, and 27A-B, the heights of the columns correspond to the magnitude of the corresponding symbols, with the symbols represented as unsigned bytes ranging in value from 0 to 255. As shown in FIG. 24A, the symbol represented by column 2402 corresponds to the lower, left-hand corner symbol Table 1, with indices (−2,−2) according to the context-indexing method discussed with reference to FIG. 21. As can be appreciated from Table 1 and from FIGS. 24A-B, the predicted symbol (2404 in FIG. 24B) has the precise value that a casual observer would estimate for that symbol, based on the pattern of symbol values in the context shown in Table 1 and the uniform, discrete, step-like gradient easily observed in FIGS. 24A-B.

Using the same illustration conventions and table conventions used, above, to illustrate operation of the predictor $F_a$ on a first exemplary context, Tables 2 and 3, below, show a second and third exemplary context, shown in three-dimensional renderings in FIGS. 25A-B and 26A-B, respectively.

TABLE 2

| 50 | 50 | 152 | 152 | 152 |
|---|---|---|---|---|
| 50 | 50 | 152 | 152 | 152 |
| 50 | 50 | (110) | 152 | 152 |
| 50 | 50 | 152 | 152 | 152 |
| 50 | 50 | 152 | 152 | 152 |

TABLE 3

| 50 | 50 | 50 | 152 | 152 |
|---|---|---|---|---|
| 50 | 50 | 50 | 152 | 152 |
| 50 | 50 | (93) | 152 | 152 |
| 50 | 50 | 50 | 152 | 152 |
| 50 | 50 | 50 | 152 | 152 |

Figure 25A:
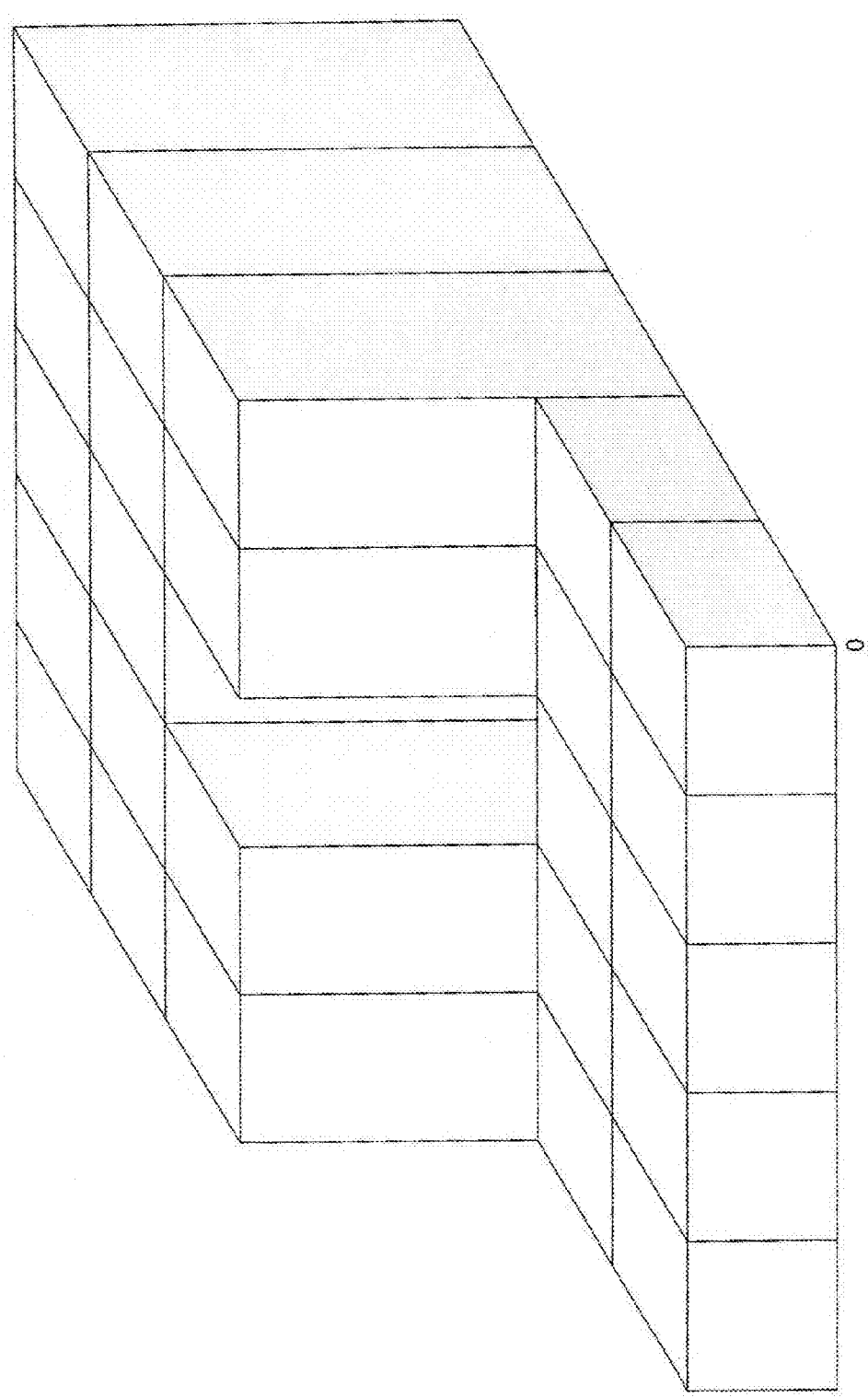
Figure 25B:
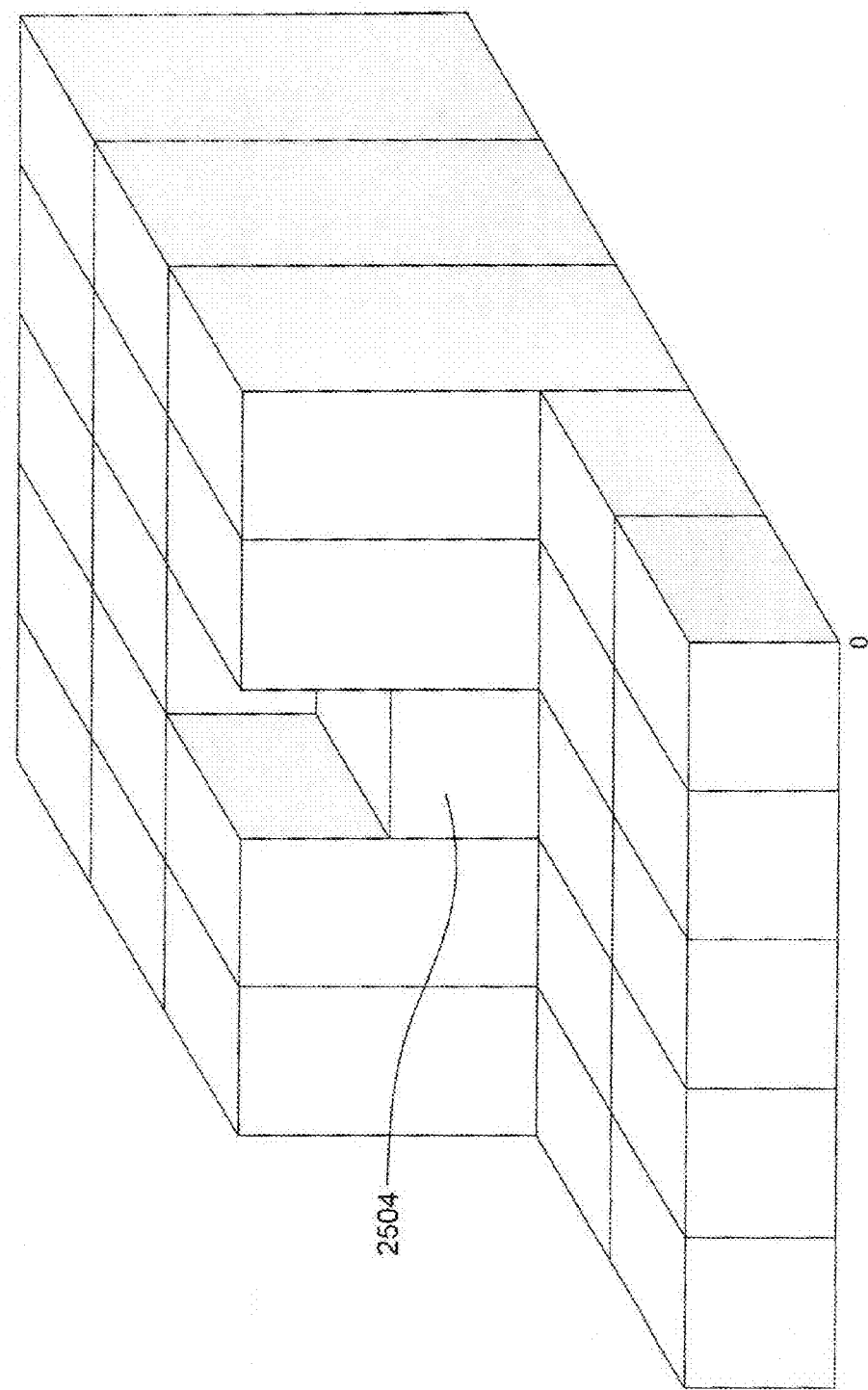
Figure 26A:
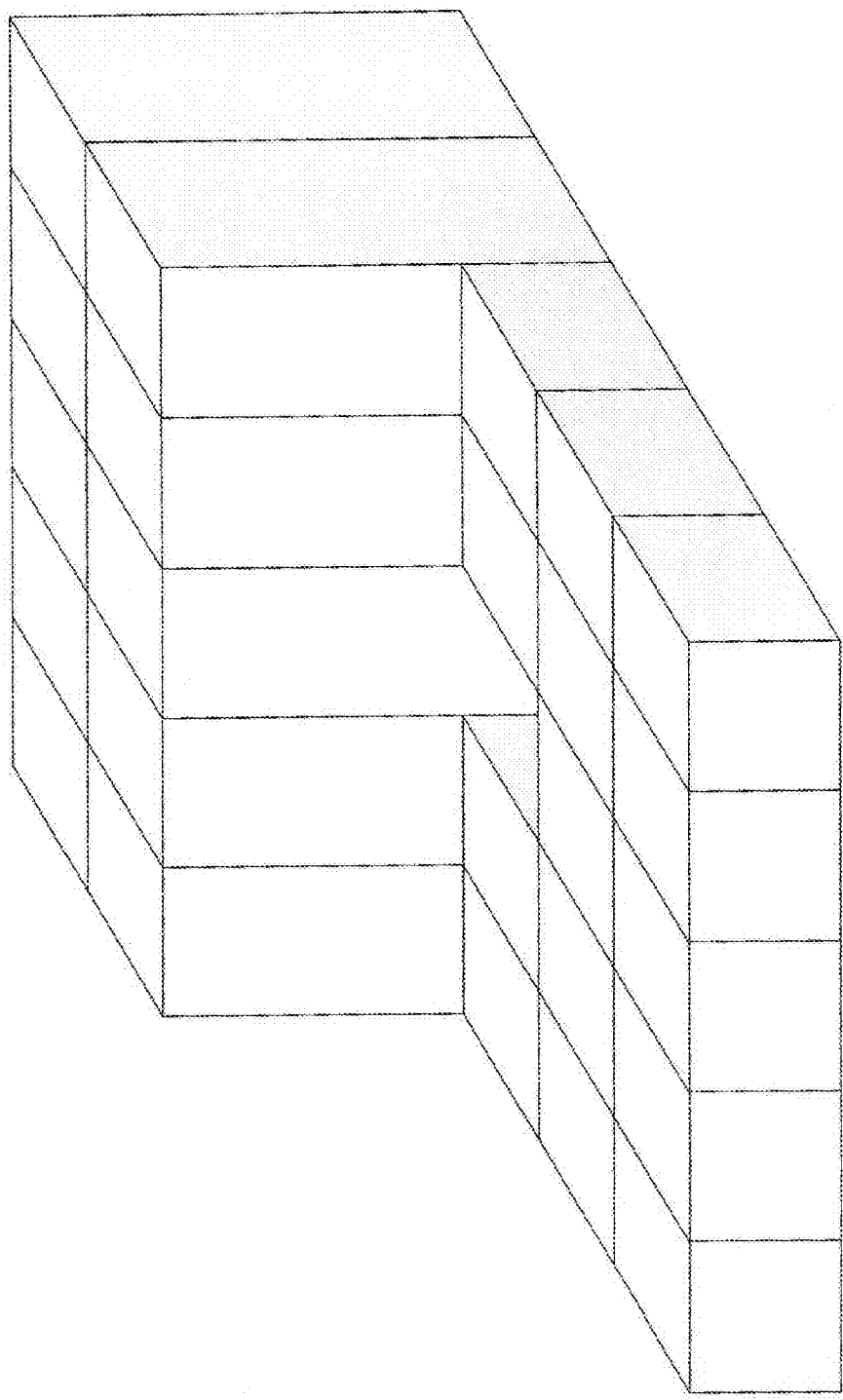
Figure 27A:
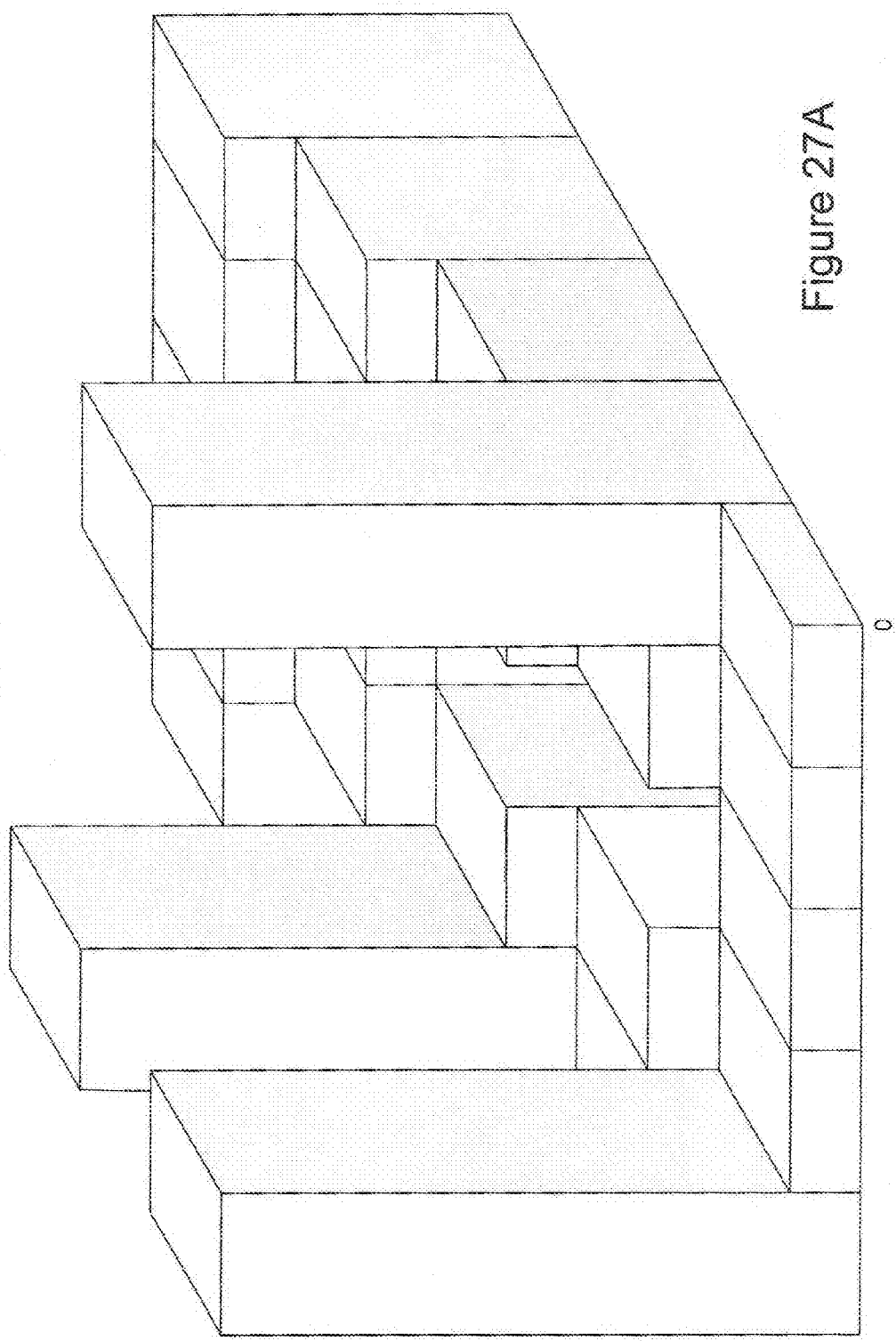

In these second and third exemplary contexts, the central, embedded symbol falls either to the right, in FIGS. 25A-B and Table 2, or to the left, in FIGS. 26A-B and Table 3, of an edge that occurs within the context. In Tables 2 and 3, the edge is vertical, while in the three-dimensional renderings, the edge appears to be horizontal. In the case that the embedded symbol falls to the right of the edge, as illustrated in FIG. 27A, the value predicted by predictor $F_a$, as shown in FIG. 25B 2504, has substantially lower magnitude than a casual observer would predict for the central-symbol value. The predictor $F_a$ has a tendency to smooth, or weaken, sharp edges, such as the sharp edges shown in FIGS. 25A-26B, since the predictor $F_a$ computes an average value from symbols lying on either side of the edge. Similarly, when the central, embedded symbol falls to the left of the edge, as shown in FIG. 26A, then the predicted value (2604 in FIG. 26B) has a greater magnitude than that which would be predicted by the casual observer, based on the pattern of values in Table 3 and the clear appearance of an edge in FIGS. 26A-B. Again, the predictor $F_a$ has a tendency to smooth, or obscure, sharp edges in the image. Were the predictor to be applied along a vertical column within the image that includes the central, embedded symbol in FIG. 26A, a column of predicted values would result, with the predicted values intermediate between the values of symbols to the left of the edge and the value of symbols to the right of the edge. The sharp edge in the original image would therefore be altered to have a stair-like, discretely smoothed appearance.

Table 4, provided below, shows a fourth, exemplary context similar to the first exemplary context, provided in Table 1, above, but with noise introduced.

TABLE 4

| 250 | 50  | 249 | 10  | 125 |
|-----|-----|-----|-----|-----|
| 25  | 50  | 75  | 100 | 125 |
| 25  | 0   | 94  | 100 | 125 |
| 25  | 50  | 75  | 100 | 125 |
| 25  | 255 | 75  | 100 | 125 |

Note that the value predicted for the central, embedded symbol, 94, is substantially greater than the value predicted for the noise-free exemplary context shown in Table 1. FIGS. 27A-B provide three-dimensional renderings of the context before and after symbol prediction, similar to FIGS. 24A-B, 25A-B and 26A-B. When noise is introduced to the data within the context, predictor $F_a$ is less effective at predicting a clean value that would be predicted by an observer's appreciation of underlying trends or patterns of symbol values within the context.

A more desirable context-based predictor would be a context-based predictor that can be adjusted, or adapted, to particular characteristics, both local and global, of an image for which cleaned symbols are predicted, as part of a filtering or denoising operation. For example, in a noise-free image with a single uniform gradient, such as the image that includes the data within the context shown in FIG. 24A, or with no gradient, the predictor $F_a$ may provide very high prediction accuracy. However, when the image contains significant levels of noise, as shown in the context of FIG. 27A, a different predictor that does not average over noisy symbol values, or that at least considers noisy values as less significant, may prove more effective. In noise-free portions of an image that contain edges and other legitimate discontinuities, a very different type of predictor may be needed to avoid obscuring or removing desirable detail. Adaptive context-based predictors of the present invention are parameterized so that the adaptive context-based predictors behave differently depending on the noise level within a region of the image where the adaptive context-based predictors are applied, the noise level within the image, in general, the sharpness of gradients and prevalence of discontinuities in regions of the image as well as within the image as a whole, characteristics of the noise-introducing channel by which the noise is modeled, and other such characteristics by which an image or other dataset is characterized. By correctly determining parameter values during a filtering or denoising process, an accurate parameterized version of the adaptive context-based predictor is obtained, so that the filtering or denoising operation achieves effective filtering and denoising, despite noise within the images to which the adaptive context-based predictor is applied, differing types and numbers of discontinuities, such as edges, within the images to which the adaptive context-based predictor is applied, and despite the occurrences of other simple-predictor-frustrating problems within the images. The adaptive context-based predictors of the present invention can be described as:

$$\hat{x}=F_P(C(x))$$

where $C(x)$ is the context of symbol x;
$\hat{x}$ is the predicted value of x;
P is a vector of parameters.

Figure 28:
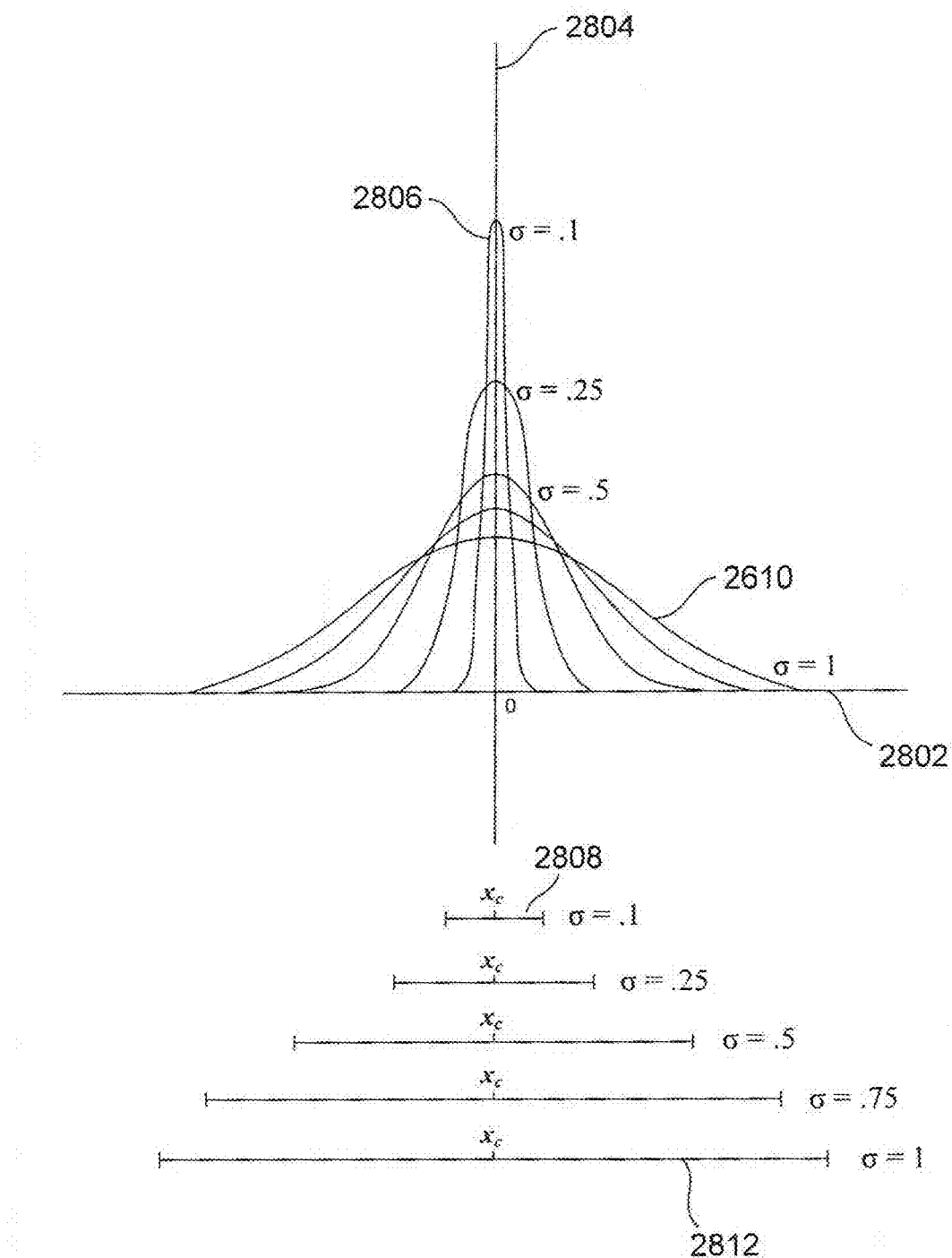
FIG. 28 illustrates one method for modeling the noise level within an image or other data.

FIG. 28 illustrates one method for modeling the noise level within an image or other data. In a Gaussian model for noise, the noise is normally distributed. In other words, the value of a noisy symbol "x" can be modeled as:

$$x=x_c+\eta$$

where $x_c$ is the clean symbol corresponding to noisy symbol x; and
$\eta$ is a normally distributed random variable with 0 mean. In this model, the standard deviation, $\sigma$, of the normal distribution of $\eta$ characterizes the level of noisiness. In FIG. 28, five different normal distributions with standard deviations $\sigma$=0.1, 0.25, 0.5, 0.75, and 1.0 are plotted with respect to a horizontal x axis 2802 and vertical y axis 2804. Note that the distributions are plotted for x values that range from −10 to 10. Similar distributions for symbols in the range 0, 1, . . . , 255 would have larger standard deviations, such as between 5 and 30. As the standard deviation $\sigma$ increases, the distribution broadens and flattens. According to the above expression for the Gaussian-noise model, the range of symbol values x expected in a noisy image for the clean symbol value $x_c$ increases as $\sigma$ increases and the normal distribution broadens and flattens. Thus, for $\sigma$=0.1, the normal distribution 2806 is narrow and sharp, and the effective range of noisy-symbol values x modeled as the clean symbol $x_c$ to which the random variable $\eta$, selected at random from the normal distribution 2806, is added to $x_c$ is shown represented by line segment 2808 below the plot of the narrow, normal distribution. By contrast, the range of noisy symbols x obtained when $\eta$ is distributed according to a normal distribution 2810 with $\sigma$=1 is a much broader longer segment 2812. The ranges shown in FIG. 28 for noisy-symbol values can be regarded as projections of the normal distributions, out to −w$\sigma$ on the left of the origin and w$\sigma$ on the right of the origin, onto the x axis, where w is a value greater than 3. Random selection of $\eta$ from the normal distribution 2806 produces noisy symbols x relatively close, in value, to corresponding clean symbol $x_c$, as represented by the short length of line segment 2808, while the noisy symbols x produced when the $\eta$ values are randomly selected from normal distribution 2810 may differ, in value, significantly from the corresponding clean symbol $x_c$. Thus, $\sigma$, the standard deviation of a particular normal distribution from which the $\eta$ values are selected according to the above described Gaussian-noise model, represents a measure of the noisiness of an image or a noise-introducing channel through which the image is transmitted, stored, retrieved, or otherwise manipulated.

When the vector of parameters P is at least partially functionally determined by the noisiness of an image $\sigma$, expressed by:

$$P=f(\sigma),$$

then adaptive context-symbol-embedded predictor $F_P$ can be designed to adapt to changing levels of noise in order to provide effective symbol prediction despite the presence of noise in the image or dataset from which contexts for symbol prediction are generated. Embodiments of the present invention include parameterized, adaptive context-symbol-embedded predictors with parameters that functionally depend, or partially functionally depend, on a level of noise in the datasets to which they are applied.

Next, a detailed description of a specific adaptive context-based predictor $F_P$ is provided. As discussed above, this specific adaptive context-based predictor $F_P$ operates on 5×5 contexts, such as the 5×5 context shown in FIG. 21.

First, eight different, overlapping, directional wings, each wing comprising six of the 24 symbols within the context, are defined as:

N={(−1,0), (−1,1), (0,1), (0,2), (1,1), (1,0)}
NE={(−1,1), (0,2), (1,1), (1,−1), (2,2), (2,0)}
E={(0,1), (1,1), (1,0), (2,0), (1,−1), (0,−1)}
SE={(−1,−1), (0,−2), (1,1), (1,−1), (2,0), (2,−2)}
S={(−1,0), (−1,−1), 0,−1, (0,−2), (1,−1), (1,0)}
SW={(−2,0), (−2,−2), (−1,1), (−1,−1), (0,−2), (1,−1)}
W={(−2,0), (−1,1), (−1,0), (−1,−1), (0,1), (0,−1)}
NW={(−2,2), (−2,0), (−1,1), (−1,−1), (0,2), (1,1)}

Figure 29A:
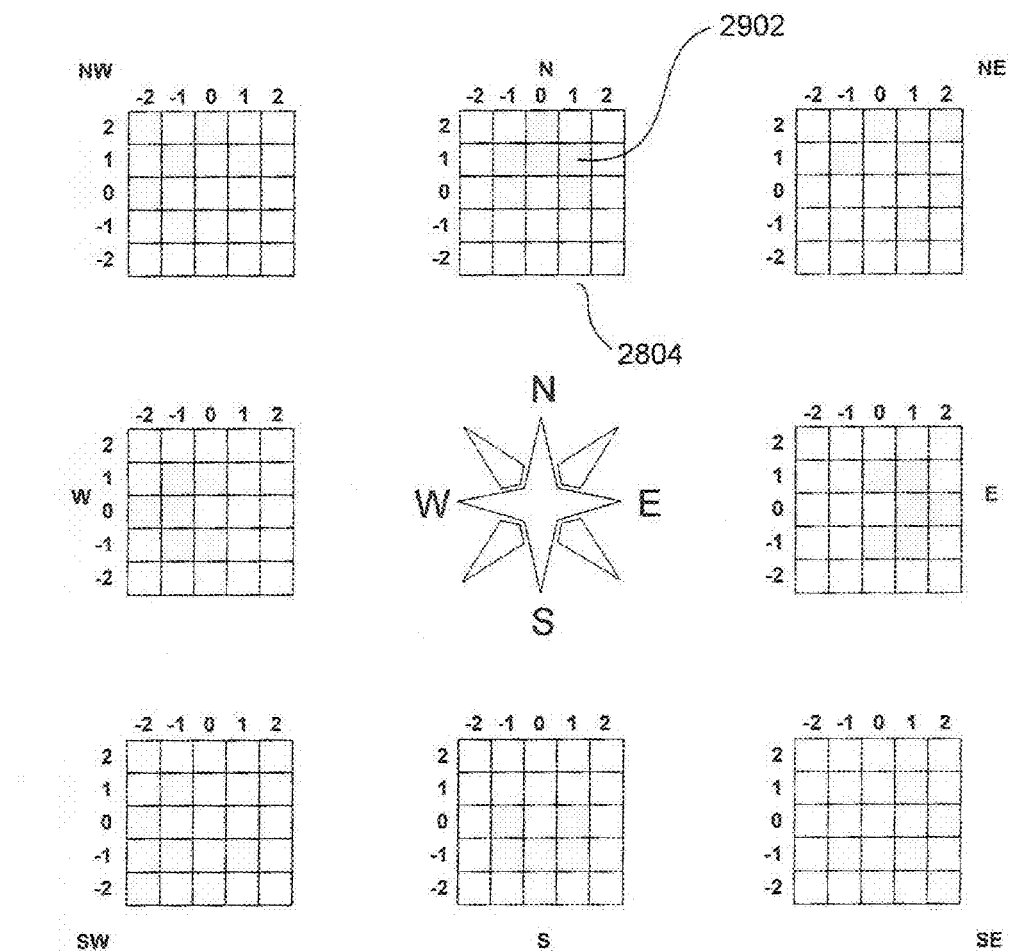
FIG. 29A illustrates eight different wings within a 5×5 context that are used by a context-based predictor that represents one embodiment of the present invention.

FIG. 29A illustrates eight different wings within a 5×5 context that are used by a context-based predictor that represents one embodiment of the present invention. In FIG. 29A, each wing is represented as six shaded, or darkened, cells within a 5×5 context. For example, the wing N is shown as the wedge-like pattern of darkened cells 2902 within context 2904. In the following discussion, the context in which the predictor $F_P$ operates is referred to as C, and elements within the context are referred to as "$C_{(a,b)}$," where a and b are indices for the symbol or cell within the context, as discussed above with reference to FIG. 21. In other words:

C=context or template=$C_{(a,b)}$ where a ∈ {−2,−1,0,1,2} and b ∈ {−2,−1,0,1,2}

The set G is the set of the eight different directions of the above-described eight directional wings, or:

G={N, NE, E, SE, S, SW, W, NW}

For each wing described by a direction g ∈ G, a weighted average $a_g$ and a gradient magnitude $d_g$ are defined, as follows:

$$\alpha_N = (2C_{(0,1)} + \sqrt{2}\,(C_{(-1,1)} + C_{(1,1)}) + C_{(0,2)})/(3+2\sqrt{2})$$

$$\alpha_E = (2C_{(1,0)} + \sqrt{2}\,(C_{(1,1)} + C_{(1,-1)}) + C_{(2,0)})/(3+2\sqrt{2})$$

$$\alpha_S = (2C_{(0,-1)} + \sqrt{2}\,(C_{(-1,-1)} + C_{(1,-1)}) + C_{(0,-2)})/(3+2\sqrt{2})$$

$$\alpha_W = (2C_{(-1,0)} + \sqrt{2}\,(C_{(-1,1)} + C_{(-1,-1)}) + C_{(-2,0)})/(3+2\sqrt{2})$$

$$\alpha_{NE} = (\sqrt{2}\,(C_{(0,1)} + C_{(1,0)}) + C_{(1,1)})/(1+2\sqrt{2})$$

$$\alpha_{SE} = (\sqrt{2}\,(C_{(0,-1)} + C_{(1,0)}) + C_{(1,-1)})/(1+2\sqrt{2})$$

$$\alpha_{SW} = (\sqrt{2}\,(C_{(0,-1)} + C_{(-1,0)}) + C_{(-1,-1)})/(1+2\sqrt{2})$$

$$\alpha_{NW} = (\sqrt{2}\,(C_{(0,1)} + C_{(-1,0)}) + C_{(-1,1)})/(1+2\sqrt{2})$$

$$d_N = |C_{(0,1)} - C_{(0,2)} + C_{(1,0)} - C_{(1,1)} + C_{(-1,0)} - C_{(-1,1)}|$$

$$d_S = |C_{(0,-2)} - C_{(0,-1)} + C_{(1,-1)} - C_{(1,0)} + C_{(-1,-1)} - C_{(-1,0)}|$$

$$d_E = |C_{(2,0)} - C_{(1,0)} + C_{(1,1)} - C_{(0,1)} + C_{(1,-1)} - C_{(0,-1)}|$$

$$d_W = |C_{(-1,0)} - C_{(-2,0)} + C_{(0,1)} - C_{(-1,1)} + C_{(0,-1)} - C_{(-1,-1)}|$$

$$d_{NE} = \frac{1}{\sqrt{2}}|C_{(2,2)} - C_{(1,1)} + C_{(0,2)} - C_{(-1,1)} + C_{(2,0)} - C_{(1,-1)}|$$

$$d_{SE} = \frac{1}{\sqrt{2}}|C_{(2,-2)} - C_{(1,-1)} + C_{(0,-2)} - C_{(-1,-1)} + C_{(2,0)} - C_{(1,1)}|$$

-continued $$d_{NW} = \frac{1}{\sqrt{2}}|C_{(-1,-1)} - C_{(-2,0)} + C_{(-1,1)} - C_{(-2,2)} + C_{(1,1)} - C_{(0,2)}|$$

$$d_{SW} = \frac{1}{\sqrt{2}}|C_{(-1,1)} - C_{(-2,0)} + C_{(-1,-1)} - C_{(-2,-2)} + C_{(1,-1)} - C_{(0,-2)}|$$

Figure 29B:
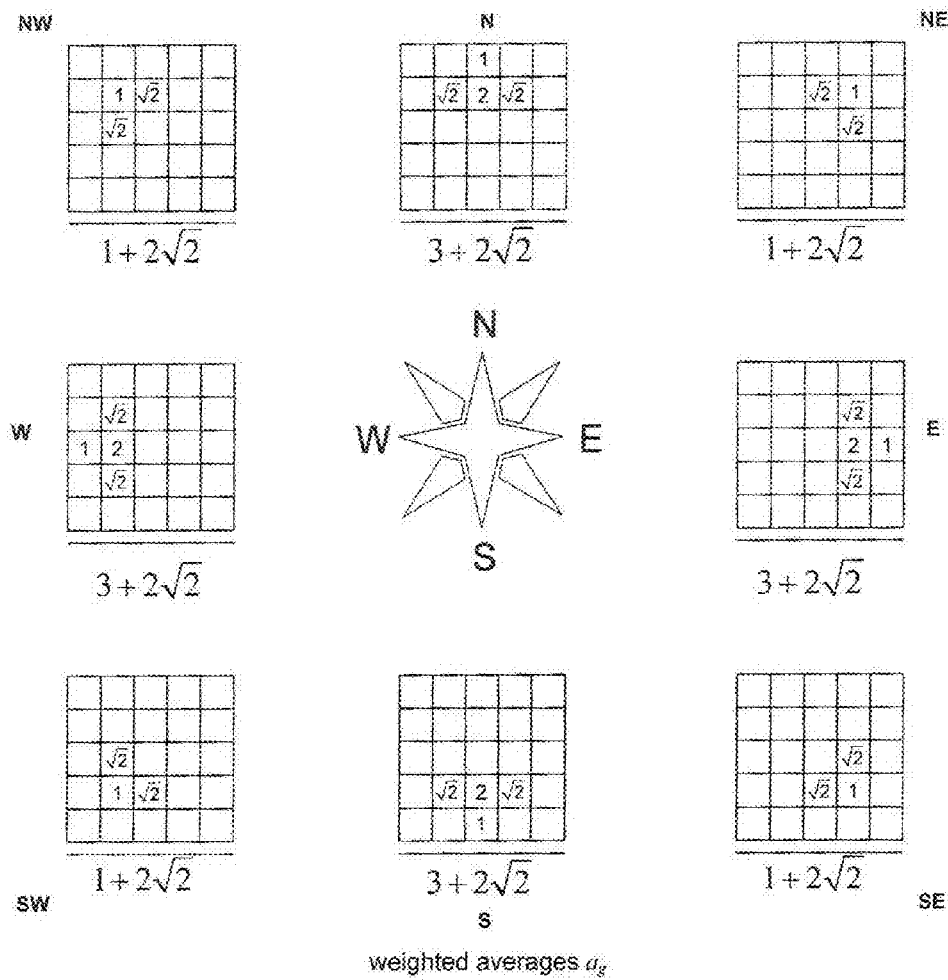
FIG. 29B illustrates computation of the weighted wing averages $a_g$ for a 5×5 context that are used by a context-based predictor that represents one embodiment of the present invention.

FIG. 29B illustrates computation of the weighted wing averages $a_g$ for a 5×5 context that are used by a context-based predictor that represents one embodiment of the present invention. In FIG. 29B, the coefficients for the symbol members of the various wings used to compute the weighted wing averages are shown within the cells corresponding to those symbols, and divisors of the symbol-member terms are shown below each context.

Figure 29C:
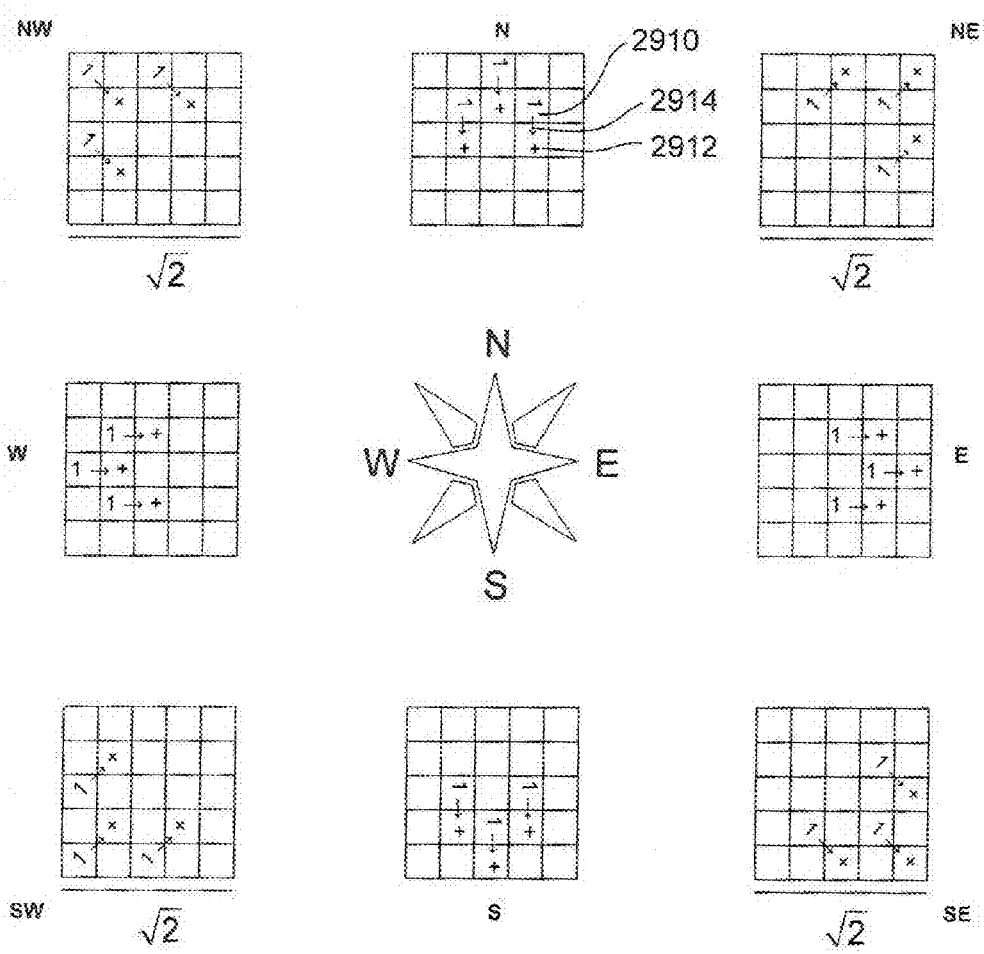
FIG. 29C illustrates computation of wing gradient magnitudes $d_g$ for a 5×5 context that are used by a context-based predictor that represents one embodiment of the present invention.

FIG. 29C illustrates computation of wing gradient magnitudes $d_g$ for a 5×5 context that are used by a context-based predictor that represents one embodiment of the present invention. In FIG. 29C, each subtraction operation in the wing-gradient-magnitude computation is represented by an arrow, with the head of the arrow placed in the symbol from which the symbol corresponding to the tail of the arrow is subtracted. For example, in the computation of $d_N$, the symbol value C(1,−1) 2910 is subtracted from the symbol value C(1, 0) 2912, as represented by arrow 2914.

The minimum wing gradient magnitude, $d_{min}$, is defined as:

$$d_{min} = \min(d_N, d_S, d_W, d_E, d_{NW}, d_{NE}, d_{SE}, d_{SW})$$

Thus, for a particular context C, the wing weighted averages $a_g$, wing gradient magnitudes $d_g$, and the minimum wing gradient magnitude $d_{min}$ is obtained by the above-shown arithmetic operations.

A first parameter t for the parameterized adaptive context-based predictor $F_P$ is a threshold gradient difference. The threshold gradient difference t is used as a threshold for computing wing weights $w_g$ according to:

$$w_g = \begin{cases} \dfrac{1}{1+\alpha f_\beta(d_g)}, & \text{when } d_g - d_{min} \le t \\ 0, & \text{when } d_g - d_{min} > t \end{cases}$$

where a and β are parameters;

$d_g$ is a wing-gradient magnitude;

$d_{min}$ in is a minimum wing-gradient magnitude.

The function $f_\beta$ is a non-negative monotonically non-decreasing function of its wing-gradient-magnitude argument. One example of a suitable function $f_\beta$ is defined as:

$$f_\beta(d) = d^\beta$$

The parameter α, in the above equation for wing weights $w_g$, controls the degree to which the wing weights are affected by the magnitude of the corresponding wing gradient magnitudes. The parameter α sets the responsiveness of the wing-weight calculation to gradient magnitudes computed from the wing. Note that a wing weight $w_g$ ranges from approaching 0, when $\alpha f_\beta(d)$ is a large number, to 1, when α=0, when $f_\beta(d) \rightarrow 0$, or both.

In the current embodiment of the adaptive context-based predictor $F_P$, the vector of parameters P includes three elements:

$$P = \begin{bmatrix} t \\ \alpha \\ \beta \end{bmatrix}$$

These three parameters can be determined empirically or estimated from various image and noise-introducing-channel-model characteristics.

Finally, using the above expressions for $a_g$, $d_g$, $d_{min}$, P, $\alpha$, $\beta$, $\gamma$, and $w_g$, an expression for $F_P$ for a specific embodiment of the adaptive context-based predictor $F_P$ is provided as:

$$\hat{x} = F_P C(x) = \frac{\sum_{g \in G} w_g a_g}{\sum_{g \in G} w_g}$$

In other words, the value $\hat{x}$ predicted by $F_P$ for context C(x) is the sum of the products of the wing weights and corresponding weighted averages divided by the sum of the wing weights. The parameterized adaptive context-based predictor $F_P$ that represents one embodiment of the present invention is adjusted by varying the values of t, $\alpha$, and $\beta$. Parameter $\alpha$ may be varied inversely proportionally to the noise level $\sigma$ so that, when noise is high, and gradients of questionable legitimacy, a smaller weighting disparity between low-gradient and high-gradient wings is reflected in the computed wing weights $w_g$. The parameter t may vary proportionally with a degree of legitimate edginess and prevalence of gradients within an image, when these characteristics of the image are known. The parameter $\beta$ may also vary inversely proportionally to the noise level. In general, the value of the parameters, or the value of the parameter-vector P may be a complex function of global image characteristics, local image characteristics in the region including the context for which a value is predicted by the adaptive context-based predictor $F_P$, and characteristics of the noise-introducing channel that describes one or more sources of noise that may be present in the image. For example:

$$P = f \begin{pmatrix} g_1(\text{image}), g_2(\text{image}), \ldots, g_n(\text{image}), \\ g_{n+1}(\text{image}, i, j), g_{n+2}(\text{image}, i, j) \ldots, g_{n+m}(\text{image}, i, j), \\ g_{m+1}(\text{channel}), g_{m+2}(\text{channel}), \ldots, g_{m+l}(\text{channel}) \end{pmatrix}$$

where $g_1 \ldots g_n$ are functions of the global image;

$g_{n+1} \ldots g_{n+m}$ are functions of the local region of the image containing context C;

$g_{m+1} \ldots g_{m+l}$ are functions of the noise-introducing channel.

In this equation, each function $g_i$ returns an integer or real-number value that represents a global or local characteristic of the image or characteristic of the noise-introducing channel. In alternative embodiments, the function P=f( ) receives fewer characteristic values as arguments and/or fewer sets of values as arguments, depending on the number of characteristics considered in the parameterization of the adaptive context-based prediction function $F_P$.

Figure 30A:
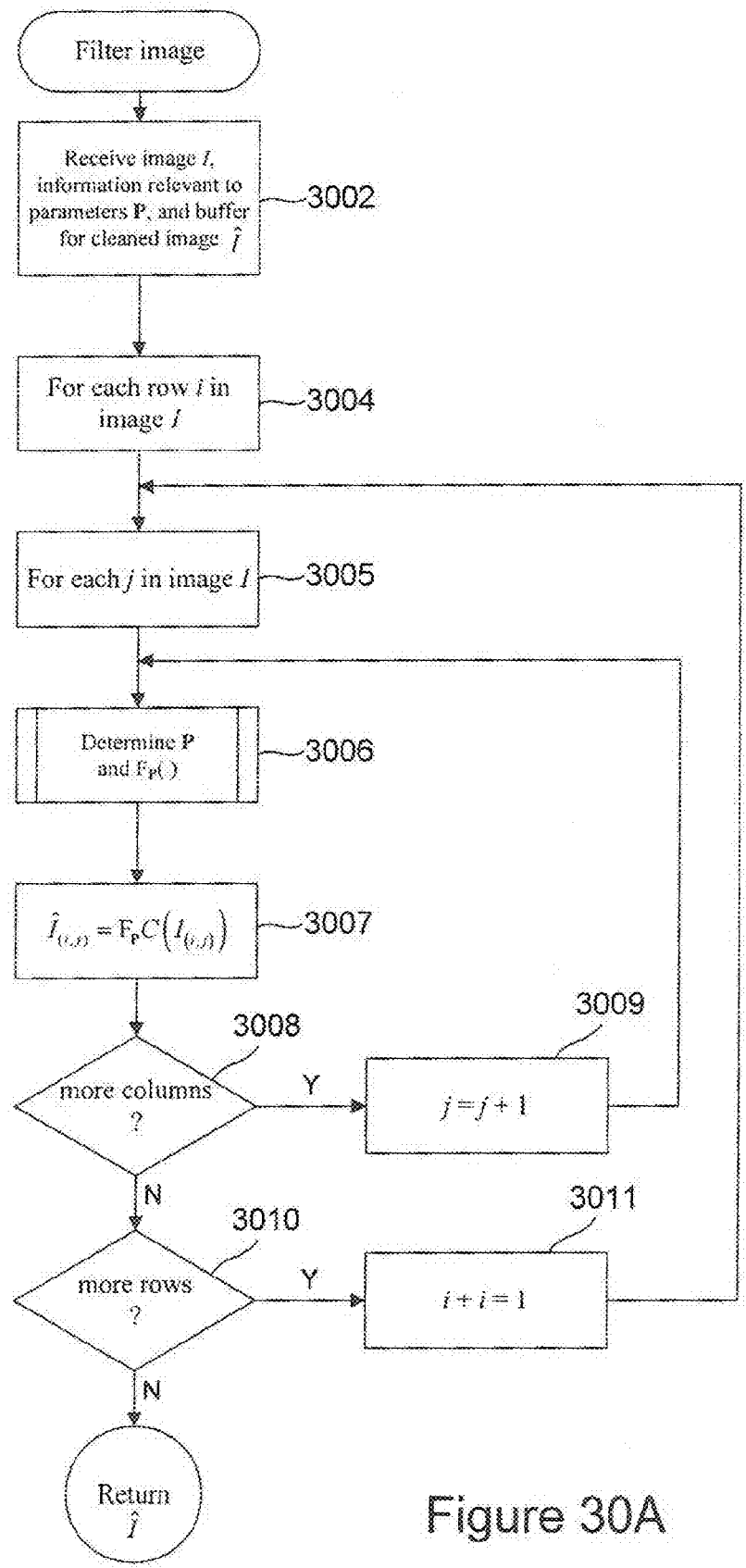
FIGS. 30A-B provide control-flow diagrams for a routine "filter image" that applies an adaptive context-based predictor, which represents an embodiment of the present invention, to an image in order to generate a filtered image.
Figure 30B:
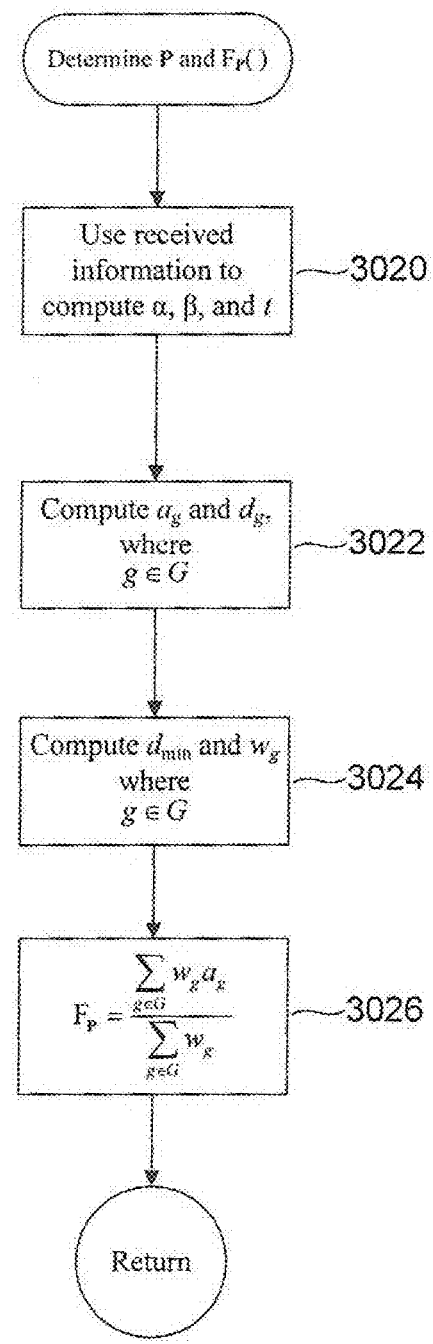

FIGS. 30A-B provide control-flow diagrams for a routine "filter image" that applies an adaptive context-based predictor, which represents an embodiment of the present invention, to an image in order to generate a filtered image. In step 3002 of FIG. 30A, the routine "filter image" receives a noisy image I, information relevant to the calculation of the parameters vector P, and a buffer for storing the filtered image $\hat{I}$. Next, in the nested for-loops of steps 3004-3011, each context-embedded symbol I(i,j) in image I is considered. First, in step 3006, the parameter vector P and adaptive context-based predictor $F_P( )$ are determined, and then, in step 3007, the currently determined predictor $F_P$ is applied to the currently considered context-embedded symbol $C(I_{(i,j)})$ to produce corresponding predicted symbol value $\hat{I}_{(i,j)}$. FIG. 30B provides a control-flow diagram for the routine for determining P and $F_P( )$, invoked in step 3006 in FIG. 30A. In step 3020, the information relevant to computing the parameters P is used to compute the constants $\alpha$, $\beta$, and t. Then, in step 3022, the wing weight averages $a_g$ and wing gradient magnitudes $d_g$ are computed, as discussed with reference to FIGS. 29A-C. Next, in step 3024, the minimum wing gradient magnitude $d_{min}$ and the wing weights $w_g$ are computed, as discussed above. Finally, the predictor $F_P( )$ is determined to be the sum of the products of wing weights and wing weighted averages divided by the sum of the wing weights, as discussed above, in step 3026. P is generally determined from a characterization of noise strength in the noise-introducing channel, and is independent of the image that is being denoised. In alternative embodiments, step 3006 in FIG. 30A computes only those parameters in P that can change within an image, and a step prior to the nested for-loops computes the parameters in P that remain constant over an image. In still alternative embodiments, P may be recomputed less frequently, or may be recomputed only upon detection of certain events or conditions during filtering or denoising.

Although the present invention has been described in terms of particular embodiments, it is not intended that the invention be limited to these embodiments. Modifications will be apparent to those skilled in the art. For example, in the described embodiment, the parameter vector P includes three elements, but, in alternative embodiments of the present invention, the parameter vector P may include a fewer or greater number of elements. In alternative embodiments of the present invention, the number of wings within a context may differ, the size and geometry of the context in which a context-embedded symbol is predicted may vary, and different values may be computed from wings and combined to compute the estimated cleaned symbol by $F_P$. In the present example, datasets are two-dimensional matrices of grayscale integer values that range from 0 to 255. However, alternative adaptive context-based predictors that represent embodiments of the present invention can be designed for symbol prediction related to other types of images encoded using different encoding methods, for numerically-encoded text, and various other types of datasets. In all cases, the adaptive context-based predictors that represent embodiments of the present invention are implemented as software programs, firmware, hardware circuitry, or a combination of software, firmware, and/or hardware circuitry. The filtering and denoising operations carried out by adaptive context-based predictors that represent embodiments of the present invention include far too many calculations to be practically carried out by hand, in reasonable periods of time, for even a very small image, and include far too many calculations to be reliably carried out by any other than an automated process.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An adaptive context-based predictor embodied in an electronic device to predict a value $\hat{x}$ from a context corresponding to a noisy-dataset symbol $z_i$, the noisy dataset corrupted with noise introduced by a noise-introducing channel, the adaptive context-based predictor comprising machine readable instructions executable to:
adapt the adaptive context-based predictor according to one or more parameters that specify adaptive context-based-predictor operation, including:
compute a number of intermediate values from the context;
compute the predicted value $\hat{x}$ from the intermediate values; and
compute prediction errors of previously predicted values for the noisy dataset;
adjust the predicted value $\hat{x}$ by shifting distributions of the prediction errors such that the distributions of the prediction errors are centered at a common center; and
store the adjusted predicted value ê in a memory.

2. The adaptive context-based predictor of claim 1, wherein the adaptive context-based predictor is to determine a parameter vector P and generate a current adapted version of the adaptive context-based predictor, $F_P$, which predicts the value $\hat{x}$ from the noisy-dataset context $C(x)$ according to:

$$\hat{x} = F_P(C(x)).$$

3. The adaptive context-based predictor of claim 2, wherein the parameter vector P includes one or more parameter elements that depend on the level of noise represented by the noise-introducing channel, which reflects a noise level within the noisy dataset.

4. The adaptive context-based predictor of claim 2, wherein the parameter vector P includes parameters that depend on a global noise level within the dataset, a local noise level within the dataset, and characteristics of the noise-introducing channel.

5. The adaptive context-based predictor of claim 2, wherein the parameter vector P is recomputed periodically during a denoising operation.

6. The adaptive context-based predictor of claim 2,
wherein the parameter vector P includes three parameters $\alpha$, $\beta$, and t;
wherein the context is an M×M context C; and
wherein a number n of different, overlapping, wings, each wing described by a different direction, wherein the directions differ from one another by $$\frac{360°}{n},$$

wherein n is a positive integer.

7. The adaptive context-based predictor of claim 6,
wherein n is eight and the context is a 5×5 context C with elements $C_{(a,b)}$, where $a \in \{-2,-1,0,1,2\}$ and $b \in \{-2,-1, 0,1,2\}$;
wherein eight different, overlapping, wings, each wing described by a direction and each wing comprising six of the 24 symbols within the context C, are defined by N={(−1,0), (−1,1), (0,1), (0,2), (1,1), (1,0)}
NE={(−1,1), (0,2), (1,1), (1,−1), (2,2), (2,0)}
E={(0,1), (1,1), (1,0), (2,0), (1−1), (0,−1)}
SE={(−1,−1), (0,−2), (1,1), (1,−1), (2,0), (2,−2)}
S={(−1,0), (−1,−1), 0,−1, (0,−2), (1,−1), (1,0)}
SW={(−2,0), (−2,−2), (−1,1), (−1,−1), (0,−2), (1,−1)}
W={(−2,0), (−1,1), (−1,0), (−1,−1), (0,1), (0,−1)}
NW={(−2,2), (−2,0), (−1,1), (−1,−1), (0,2), (1,1)} wherein G={N, NE, E, SE, S, SW, W, NW};
wherein, for each wing described by a direction $g \in G$, a weighted average $a_g$ and a gradient magnitude $d_g$ are computed as $$\alpha_N = (2C_{(0,1)} + \sqrt{2}(C_{(-1,1)} + C_{(1,1)}) + C_{(0,2)})/(3+2\sqrt{2})$$

$$\alpha_E = (2C_{(1,0)} + \sqrt{2}(C_{(1,1)} + C_{(1,-1)}) + C_{(2,0)})/(3+2\sqrt{2})$$

$$\alpha_S = (2C_{(0,-1)} + \sqrt{2}(C_{(-1,-1)} + C_{(1,-1)}) + C_{(0,-2)})/(3+2\sqrt{2})$$

$$\alpha_W = (2C_{(-1,0)} + \sqrt{2}(C_{(-1,1)} + C_{(-1,-1)}) + C_{(-2,0)})/(3+2\sqrt{2})$$

$$\alpha_{NE} = (\sqrt{2}(C_{(0,1)} + C_{(1,0)}) + C_{(1,1)})/(1+2\sqrt{2})$$

$$\alpha_{SE} = (\sqrt{2}(C_{(0,-1)} + C_{(1,0)}) + C_{(1,-1)})/(1+2\sqrt{2})$$

$$\alpha_{SW} = (\sqrt{2}(C_{(0,-1)} + C_{(-1,0)}) + C_{(-1,-1)})/(1+2\sqrt{2})$$

$$\alpha_{NW} = (\sqrt{2}(C_{(0,1)} + C_{(-1,0)}) + C_{(-1,1)})/(1+2\sqrt{2})$$

$$d_N = |C_{(0,1)} - C_{(0,2)} + C_{(1,0)} - C_{(1,1)} + C_{(-1,0)} - C_{(-1,1)}|$$

$$d_S = |C_{(0,-2)} - C_{(0,-1)} + C_{(1,-1)} - C_{(1,0)} + C_{(-1,-1)} - C_{(-1,0)}|$$

$$d_E = |C_{(2,0)} - C_{(1,0)} + C_{(1,1)} - C_{(0,1)} + C_{(1,-1)} - C_{(0,-1)}|$$

$$d_W = |C_{(-1,0)} - C_{(-2,0)} + C_{(0,1)} - C_{(-1,1)} + C_{(0,-1)} - C_{(-1,-1)}|$$

$$d_{NE} = \frac{1}{\sqrt{2}}|C_{(2,2)} - C_{(1,1)} + C_{(0,2)} - C_{(-1,1)} + C_{(2,0)} - C_{(1,-1)}|$$

$$d_{SE} = \frac{1}{\sqrt{2}}|C_{(2,-2)} - C_{(1,-1)} + C_{(0,-2)} - C_{(-1,-1)} + C_{(2,0)} - C_{(1,1)}|$$

$$d_{NW} = \frac{1}{\sqrt{2}}|C_{(-1,-1)} - C_{(-2,0)} + C_{(-1,1)} - C_{(-2,2)} + C_{(1,1)} - C_{(0,2)}|$$

$$d_{SW} = \frac{1}{\sqrt{2}}|C_{(-1,1)} - C_{(-2,0)} + C_{(-1,-1)} - C_{(-2,-2)} + C_{(1,-1)} - C_{(0,-2)}|$$

wherein a minimum wing gradient magnitude, $d_{min}$, is computed as $$d_{min} = \min(d_N, d_S, d_W, d_E, d_{NW}, d_{NE}, d_{SE}, d_{SW});$$

wherein wing weights $w_g$ are computed as $$w_g = \begin{cases} \dfrac{1}{1+\alpha f_\beta(d)}, & \text{when } d - d_{min} \leq t \\ 0, & \text{when } d - d_{min} > t \end{cases}$$

wherein the function $f_\beta$ is a non-negative and monotonically non-decreasing function of its wing-gradient-magnitude argument and parameterized by $\epsilon$; and wherein $F_P(\ )$ is computed as:

$$\hat{x} = F_P C(x) = \frac{\sum_{g \in G} w_g a_g}{\sum_{g \in G} w_g}.$$

8. The adaptive context-based predictor of claim 1, wherein the machine readable instructions to adapt the adaptive context-based predictor further comprises instructions to:
compare the previously predicted values to symbols in the noisy dataset to compute the prediction errors;
classify the prediction errors in the distributions of the prediction errors; and
compute biases among the distributions of the prediction errors with respect to the common center, wherein the distributions of the prediction errors are shifted according to the computed biases.

9. A method for filtering, by an electronic device, a noisy image I comprising a two-dimensional matrix of noisy-image symbols $I(i,j)$, to produce a filtered image $\hat{I}$ comprising a two-dimensional matrix of filtered-image symbols $\hat{I}(i,j)$, the method comprising:
determining, by the electronic device, parameter elements of a parameter vector P;
adapting an adaptive context-based predictor $F_P$ according to the parameter elements of the parameter vector P;
for each noisy-image symbol $I(i,j)$ within a context C comprising symbols near the noisy-image symbol $I(i,j)$ in the noisy image I,
predicting, by the electronic device, a corresponding filtered-image symbol $\hat{I}(i,j)$ using the adaptive context-based predictor $F_P$ that is periodically adapted by re-determining the parameter elements of the parameter vector P; and
storing, by the electronic device, the filtered-image symbol $\hat{I}(i,j)$ in an electronic memory,
wherein adapting the adaptive context-based predictor $F_P$ according to the parameter elements of the parameter vector includes:
computing prediction errors of previously predicted filtered-image symbols for the noisy image, and
shifting distributions of the prediction errors such that the distributions of the prediction errors are centered at a common center.

10. The method of claim 9, wherein the parameter vector P includes parameters that depend on a global noise level within the dataset, a local noise level within the dataset, and characteristics of the noise-introducing channel.

11. The method of claim 9,
wherein the parameter vector P includes three parameters $\alpha$, $\beta$, and t;
wherein the context C is a 5×5 context with elements $C(a,b)$ where $a \in \{-2,-1,0,1,2\}$ and $b \in \{-2,-1,0,1,2\}$ superimposed over the noisy image I with the noisy-image symbol $I(i,j)$ corresponding to $C(0,0)$;
wherein eight different, overlapping, wings, each wing described by a direction and each wing comprising six of the 24 symbols within the context C, are defined by
N={(−1,0), (−1,1), (0,1), (0,2), (1,1), (1,0)}
NE={(−1,1), (0,2), (1,1), (1,−1), (2,2), (2,0)}
E={(0,1), (1,1), (1,0), (2,0), (1,−1), (0,−1)}
SE={(−1,−1), (0,−2), (1,1), (1,−1), (2,0), (2,−2)}
S={(−1,0), (−1,−1), 0,−1, (0,−2), (1,−1), (1,0)}
SW={(−2,0), (−2,−2), (−1,1), (−1,−1), (0,−2), (1,−1)}
W={(−2,0), (−1,−1), (−1,0), (−1,−1), (0,1), (0,−1)}
NW={(−2,2), (−2,0), (−1,1), (−1,−1), (0,2), (1,1)}
wherein G={N, NE, E, SE, S, SW, W, NW};

wherein, for each wing described by a direction $g \in G$, a weighted average $a_g$ and a gradient magnitude $d_g$ are computed as $$a_N = \left(2C_{(0,1)} + \sqrt{2}\,(C_{(-1,1)} + C_{(1,1)}) + C_{(0,2)}\right)/\left(3 + 2\sqrt{2}\right)$$

$$a_E = \left(2C_{(1,0)} + \sqrt{2}\,(C_{(1,1)} + C_{(1,-1)}) + C_{(2,0)}\right)/\left(3 + 2\sqrt{2}\right)$$

$$a_S = \left(2C_{(0,-1)} + \sqrt{2}\,(C_{(-1,-1)} + C_{(1,-1)}) + C_{(0,-2)}\right)/\left(3 + 2\sqrt{2}\right)$$

$$a_W = \left(2C_{(-1,0)} + \sqrt{2}\,(C_{(-1,1)} + C_{(-1,-1)}) + C_{(-2,0)}\right)/\left(3 + 2\sqrt{2}\right)$$

$$a_{NE} = \left(\sqrt{2}\,(C_{(0,1)} + C_{(1,0)}) + C_{(1,1)}\right)/\left(1 + 2\sqrt{2}\right)$$

$$a_{SE} = \left(\sqrt{2}\,(C_{(0,-1)} + C_{(1,0)}) + C_{(1,-1)}\right)/\left(1 + 2\sqrt{2}\right)$$

$$a_{SW} = \left(\sqrt{2}\,(C_{(0,-1)} + C_{(-1,0)}) + C_{(-1,-1)}\right)/\left(1 + 2\sqrt{2}\right)$$

$$a_{NW} = \left(\sqrt{2}\,(C_{(0,1)} + C_{(-1,0)}) + C_{(-1,1)}\right)/\left(1 + 2\sqrt{2}\right)$$

$$d_N = |C_{(0,1)} - C_{(0,2)} + C_{(1,0)} - C_{(1,1)} + C_{(-1,0)} - C_{(-1,1)}|$$

$$d_S = |C_{(0,-2)} - C_{(0,-1)} + C_{(1,-1)} - C_{(1,0)} + C_{(-1,-1)} - C_{(-1,0)}|$$

$$d_E = |C_{(2,0)} - C_{(1,0)} + C_{(1,1)} - C_{(0,1)} + C_{(1,-1)} - C_{(0,-1)}|$$

$$d_W = |C_{(-1,0)} - C_{(-2,0)} + C_{(0,1)} - C_{(-1,1)} + C_{(0,-1)} - C_{(-1,-1)}|$$

$$d_{NE} = \frac{1}{\sqrt{2}}|C_{(2,2)} - C_{(1,1)} + C_{(0,2)} - C_{(-1,1)} + C_{(2,0)} - C_{(1,-1)}|$$

$$d_{SE} = \frac{1}{\sqrt{2}}|C_{(2,-2)} - C_{(1,-1)} + C_{(0,-2)} - C_{(-1,-1)} + C_{(2,0)} - C_{(1,1)}|$$

$$d_{NW} = \frac{1}{\sqrt{2}}|C_{(-1,-1)} - C_{(-2,0)} + C_{(-1,1)} - C_{(-2,2)} + C_{(1,1)} - C_{(0,2)}|$$

$$d_{SW} = \frac{1}{\sqrt{2}}|C_{(-1,1)} - C_{(-2,0)} + C_{(-1,-1)} - C_{(-2,-2)} + C_{(1,-1)} - C_{(0,-2)}|$$

wherein a minimum wing gradient magnitude, $d_{min}$, is computed as
$d_{min} = \min(d_N, d_S, d_W, d_E, d_{NW}, d_{NE}, d_{SE}, d_{SW})$;
wherein wing weights $w_g$ are computed as $$w_g = \begin{cases} \dfrac{1}{1 + \alpha f_\beta(d)}, & \text{when } d - d_{min} \leq t \\ 0, & \text{when } d - d_{min} > t \end{cases}$$

wherein the function $f_\beta$ is a non-negative and monotonically non-decreasing function of its wing-gradient-magnitude argument and parameterized by $\beta$; and
wherein $F_P$ computes $\hat{I}(i,j)$ by :

$$\hat{I}(i,j) = F_P C(I(i,j)) = \frac{\sum_{g \in G} w_g a_g}{\sum_{g \in G} w_g}.$$

12. The method of claim 9, wherein adapting the adaptive context-based predictor $F_P$ according to the parameter elements of the parameter vector P comprises:
comparing the previously predicted filtered-image symbols to the noisy-image symbols to compute the prediction errors;
classifying the prediction errors in the distributions of the prediction errors; and
computing biases among the distributions of the prediction errors with respect to the common center, wherein the distributions of the prediction errors are shifted based on the computed biases.

* * * * *

UNITED STATES PATENT AND TRADEMARK OFFICE
CERTIFICATE OF CORRECTION

PATENT NO. : 8,437,571 B2  
APPLICATION NO. : 12/387404  
DATED : May 7, 2013  
INVENTOR(S) : Seroussi et al.

Page 1 of 1

It is certified that error appears in the above-identified patent and that said Letters Patent is hereby corrected as shown below:

In the Claims

In column 23, line 30, in Claim 1, delete "ê" and insert -- $\hat{x}$ --, therefor.

In column 23, line 38, in Claim 3, delete "claim 2,wherein" and insert -- claim 2, wherein --, therefor.

In column 24, line 10, in Claim 7, delete "0,-1," and insert -- (0,-1), --, therefor.

In column 24, line 67, in Claim 7, delete "ϵ;" and insert -- β; --, therefor.

In column 25, line 1, in Claim 7, delete "F$_P$( )is" and insert -- F$_P$( ) is --, therefor.

In column 25, line 63, in Claim 11, delete "0,-1," and insert -- (0,-1), --, therefor.

Signed and Sealed this  
First Day of October, 2013

Teresa Stanek Rea  
*Deputy Director of the United States Patent and Trademark Office*